United States Patent
Nicholas

(10) Patent No.: US 8,381,643 B2
(45) Date of Patent: Feb. 26, 2013

(54) PITTER APPARATUS WITH ROTARY OPERATED DRIVE SYSTEM

(75) Inventor: Rodney G. Nicholas, San Leandro, CA (US)

(73) Assignee: Ashlock Company, a division of Vistan Corp., San Leandro, CA (US)

(*) Notice: Subject to any disclaimer, the term of this patent is extended or adjusted under 35 U.S.C. 154(b) by 390 days.

(21) Appl. No.: 12/731,985

(22) Filed: Mar. 25, 2010

(65) Prior Publication Data

US 2011/0232508 A1 Sep. 29, 2011

(51) Int. Cl.
*A47J 25/00* (2006.01)
*A23N 4/02* (2006.01)

(52) U.S. Cl. ............................................. 99/547; 99/559

(58) Field of Classification Search ............. 99/542, 99/544, 547–566, 591, 593
See application file for complete search history.

(56) References Cited

U.S. PATENT DOCUMENTS

| | | | | |
|---|---|---|---|---|
| 1,985,336 A * | 12/1934 | Chapelle | ............ | 99/565 |
| 2,413,861 A | 1/1947 | Carroll | ............ | 146/18 |
| 2,517,342 A * | 8/1950 | Pesch | ............ | 99/550 |
| 2,808,863 A | 10/1957 | Gaddini | ............ | 146/28 |
| 2,859,783 A * | 11/1958 | Skog | ............ | 99/489 |
| 2,946,361 A * | 7/1960 | Skog et al. | ............ | 99/550 |
| 3,219,080 A * | 11/1965 | Buchner | ............ | 99/584 |
| 3,556,281 A | 1/1971 | Margaroli | ............ | 198/33 |
| 3,618,648 A | 11/1971 | Becq | ............ | 146/17 A |
| 3,695,322 A | 10/1972 | Anderson et al. | ............ | 146/28 R |
| 3,731,615 A * | 5/1973 | Margaroli et al. | ............ | 99/559 |
| 4,103,607 A | 8/1978 | Hansen et al. | ............ | 99/548 |
| 4,485,732 A | 12/1984 | Goudard | ............ | 99/549 |
| 5,619,912 A | 4/1997 | Silbermann | ............ | 99/559 |
| 5,870,949 A * | 2/1999 | Cimperman et al. | ............ | 99/559 |
| 2005/0284311 A1 | 12/2005 | Politino et al. | ............ | 99/547 |

\* cited by examiner

*Primary Examiner* — Nini Legesse
(74) *Attorney, Agent, or Firm* — Girard & Equitz LLP

(57) ABSTRACT

A pitting knife assembly including a pitting knife mount and a pulley drive assembly coupled and configured to move the knife mount around a circular or substantially circular path, and a fruit pitting apparatus including such an assembly. During operation of the pitting knife assembly with at least one pitting knife mounted to the knife mount and a fruit conveying assembly positioned to convey fruit to the pitting knife assembly, the pitting knife can produce pitted fruit by moving into engagement with fruit conveyed by the conveying assembly (to pit the fruit) as the knife mount moves through a first portion of the path, and the pitting knife can then move out of engagement with (and away from) the pitted fruit as the knife mount moves through a second portion of the path.

15 Claims, 13 Drawing Sheets

PITTER APPARATUS WITH ROTARY OPERATED DRIVE SYSTEM

FIELD OF THE INVENTION

The invention pertains to an apparatus for removing pits from prunes or other fruit (e.g., dates). In some embodiments, the inventive apparatus is configured to translate prunes (or other fruit) seated in holders to a set of pitting knives, and includes a pulley assembly configured to drive the knives around a circular (or other) closed path into (and then out of) engagement with fruit in the holders.

BACKGROUND OF THE INVENTION

Herein, the expression that an object (e.g., a pitting knife or pitting knife assembly) moves or is moved "around" a closed path (e.g., a circular or substantially circular path) denotes that the object's center of gravity moves or is moved around the closed path. When the object is rigid, and the object moves or is moved "around" a closed path, each element of the object (e.g., the tip of each pitting knife of a rigid pitting knife assembly) moves or is moved around the closed path.

Throughout this disclosure, including in the claims, the expression "pulley" is used in a broad sense to denote a wheel for transmitting power and/or changing the direction of motion. Thus, a wheel having a rim (e.g., a grooved, flat, or slightly convex rim) configured to translate a belt as the wheel rotates, is one type of pulley. Examples of pulleys of this type are depicted in several of the figures (e.g, FIG. 14 which shows pulleys 304 and 315). Another example of a "pulley" as used herein is a gear (having teeth around its rim) of a knife drive assembly, where the gear is coupled and configured to translate a pitting knife mount around a closed path (e.g., an at least substantially circular path) as the gear rotates, or to cause a subassembly of the knife drive assembly (said subassembly including a pitting knife mount and typically also other pulleys) to translate a pitting knife mount around a closed path as the gear rotates.

Throughout this disclosure, including in the claims, the expression "pulley drive assembly" is used in a broad sense to denote a drive assembly including at least one pulley (e.g., pulleys which translate belts, or pulleys which are gears).

The term "box cam" is used throughout the specification to denote a cam that includes at least one cam track capable of causing a cam follower engaged therewith to execute reciprocating motion as the box cam rotates. The term "reciprocating motion" denotes cyclical motion including motion in a first direction (at one moment of the cycle) and motion in the direction opposite the first direction (at another moment of the cycle). Thus, an open cam (mounted on a shaft) is not a box cam if the open cam can drive a cam follower downward but not upward during a complete rotation of the open cam about the axis of the shaft (typically, an externally supplied spring force is required to drive the cam follower upward).

In some systems for pitting prunes (or other fruit), a pitting knife drive assembly drives pitting knives (sometimes referred to as "punches" or "pushers") in reciprocating fashion along a linear (vertical) path, and fruit conveying assembly moves the fruit to be pitted into the knives' path and moves the pitted fruit out of engagement with the knives. Typically, in each cycle of operation of such an knife drive assembly, a mechanism moves the knives vertically upward and compresses a spring, and then (when fruit to be pitted has been positioned below the knives) the mechanism releases the knives to allow the spring to drive them vertically downward into engagement with the fruit. U.S. Pat. No. 3,618,648 (issued Nov. 9, 1971) for example, describes such a system.

U.S. Pat. No. 4,485,732 (issued Dec. 4, 1984) also discloses a pitting knife drive assembly which drives pitting knives in reciprocating fashion along a linear (vertical) path. In each cycle of operation of this assembly, a mechanism translates the knives vertically upward, and then (when fruit to be pitted has been positioned below the knives) the mechanism forces the knives vertically downward into engagement with the fruit.

It has also been proposed to include an open cam or box cam in a pitting knife drive assembly to move pitting knives around a two-dimensional, closed loop path into and out of engagement with fruit to be pitted. For example, U.S. Pat. No. 5,870,949 (issued Feb. 16, 1999 and assigned to the assignee of the present invention) describes such use of an open cam in a pitting knife drive assembly, and both U.S. Pat. No. 5,619,912 (issued Apr. 15, 1997 and assigned to the assignee of the present invention) and U.S. Pat. No. 5,870,949 describe such use of a box cam in a pitting knife drive assembly.

However, conventional use of a box cam (or open cam) mechanism in a pitting knife drive assembly to move pitting knives around a two-dimensional, closed loop path into and out of engagement with fruit to be pitted has several limitations and disadvantages, including the following:

there is a gap between each roller (each of the cam followers of the rocker arm assembly coupled to the knife assembly) and the box cam, which increases with wear and is amplified by the stroke arm distance to the pitting knives. This gap can cause a violent bang during the down stroke direction change and abnormal wear in the cam followers and box cam;

the cam followers roll and slide on a non lubricated box cam surface, and thus add friction load to the system;

the plunger shafts (to which the pitting knives are attached) have linear bearings that add sliding friction to the load and additional gap distance with wear, and also have linear bushings which add to the sliding friction load;

the reciprocating eccentric motion of the knife drive assembly requires use of many (e.g., ten) rotating bushings thus adding to the sliding friction load;

the speed of the box (or open) cam is limited due to the banging of the cam action;

the box (or open) cam system is very loud during operation;

the box (or open) cam assembly has lubricated parts, and particulates from its wearing parts may fall directly into the final product; and due to the shock and vibration of the box (or open) cam assembly, many parts thereof have a short life.

U.S. Pat. No. 5,870,949 describes a fruit pitting apparatus including a fruit conveying assembly suitable for use in typical embodiments of the inventive apparatus. We next describe this fruit conveying assembly with reference to FIGS. 1, 2, 2A, and 3-7.

A conventional knife drive assembly (including a box cam) of the type described in U.S. Pat. No. 5,870,949 will be described with reference to FIGS. 4 and 8-10. This conventional knife drive assembly can be mounted within pitting head housing 22 of FIGS. 1-7 or in another fruit pitting apparatus. In accordance with the present invention, an embodiment of the inventive knife drive assembly would replace the conventional knife drive assembly in a fruit pitting apparatus (e.g., as shown in FIG. 15).

FIG. 1 is a simplified side elevational view (partially cut away) of a conventional prune pitting apparatus. FIG. 2 is a cross-sectional view of the FIG. 1 apparatus taken along line 2-2 of FIG. 1. The pitting apparatus of FIG. 1 includes a frame (with sideplates 12 and 12A, legs 17, and pitting head housing 22), pulley 32B, sprockets 32C, sprocket assembly 32D, disks 34, and two conveyor chains 35 looped around sprocket assemblies 32C and 32D and disks 34. Each of elements 32B, 32C and 32D is rotatably mounted to the frame. The drive mechanism comprises motor 24, speed reducer 26, pulley 23' (attached to a first shaft mounted for rotation relative to housing 22), pulleys 21B and 11B and sprocket 59 (attached to a second shaft mounted for rotation relative to housing 22), drive belt 28 looped around pulleys 23' and 11B, and drive belt 30 looped around pulley 21B and pulley 32B. In operation, motor 24 and speed reducer 26 cause pulley 23' to rotate clockwise (in FIG. 1), causing belt 28 to rotate pulleys 21B and 11B clockwise and causing belt 30 to rotate pulley 32B clockwise. Rotating pulley 32B and sprockets 32C drive each of the conveyor chains 35 clockwise around a loop defined by sprocket assemblies 32C and 32D and disks 34. One of the chain loops is in the plane of FIG. 1, and the other chain loop is in a vertical plane parallel to the plane of FIG. 1. More specifically, as shown in FIG. 4, pulley 32B and sprockets 32C are connected to shaft 32A. As belt 30 rotates pulley 32B, pulley 32B in turn rotates shaft 32A and sprockets 32C together as a unit, thereby driving chains 35 (each chain 35 being looped around one of sprockets 32C).

Fruit holders 36 (shown in FIG. 2) are connected between conveyor chains 35, so that the fruit holders 36 are conveyed around the loop as chains 35 are driven. A roller carrier 54 is attached at one end of each holder 36, and a roller carrier 56 is attached at the holder's other end. A roller 66 is attached to each carrier 54, and a roller 68 is attached to each carrier 56. Each fruit holder includes four pocket members 58 and four pocket members 60, which define four adjustable pockets (each pocket being dimensioned to hold firmly one of the prunes or other articles to be pitted when the pocket is in a closed configuration). Variable-length rods 50 extend between carriers 54 and 56, and a spring 62 is provided between holder 36 and each of carriers 54 and 56 to spring-load the rods into their maximum-length configuration (in which members 58 and 60 are oriented so as to hold the pockets in an open configuration). Members 58 and 60 are pivotably mounted to rods 50 so that when rods 50 are compressed by action of cams 84 (mounted along sideplates 12 and 12A) on rollers 66 and 68, the members 58 and 60 pivot to decrease the size of (i.e., close) the pockets. When cams 80 allow springs 62 to move rods 50 to their elongated configuration, members 58 and 60 pivot in the opposite direction to increase the size of (i.e., open) the pockets.

FIG. 3 is a cross-sectional view of the FIG. 2 apparatus (with roller 68 omitted for clarity), taken along line 3-3 of FIG. 2, showing one of paddle wheels 38 sweeping across the pockets of a fruit holder 36. As shown in FIGS. 2 and 3, cams 80 are separated by a relative large distance, so that the pockets defined by fruit holders 36 are open when holders 36 translate past cams 80. Cams 84 are separated by a smaller distance so that the pockets defined by holders 36 are closed when holders 36 translate past cams 84. A third pair of cams (cams 85 and 85A, shown in FIGS. 4 and 5 but not in FIG. 1 or 2) is also mounted to sideplates 12 and 12A in pitting head housing 22 to perform pocket opening and closing functions within housing 22. A fourth pair of cams (cam bars 111, one of which is shown in FIG. 1) is also mounted to side plates 12 and 12A between paddle wheels 38 and pitting head housing 22 to perform pocket opening and closing functions (to be described below). Cams 80 are mounted in positions in which they cause the pockets to open when holders 36 translate past hopper 14 (to allow the pockets to receive prunes or other articles). Cams 84 are mounted in positions in which they cause the pockets to close when holders 36 translate past paddle wheels 38. Cams 85 and 85A are mounted in positions in which they cause the pockets to close as holders 36 approach pitting knives within housing 22, and then to open briefly immediately after the pit removal operation (while the pitting knives remain engaged with the fruit in holders 36), and then to close again as holders 36 continue to move through housing 22 after the pit removal operation.

Cams 85 and 85A are preferably notched cam tracks, each having an input end 89 and a notch 85B as shown in FIG. 7. Such notched implementations of cam tracks 85 and 85A are mounted so that each holder 36 translates between input ends 89 before the pitting step, and then translates between notches 85B after the pitting step. Since there are two rows of pitting knives 102 which simultaneously pit fruit in two holders 36, one holder of each such pair of holders translates between the notches 85B immediately after the pitting step, and the second holder of each pair translates between notches 85B only after the first holder has done so. Typically, roller 66 at one end of each holder 36 is offset (in the direction in which holder 36 translates) from roller 68 at the other end of the holder 36.

FIG. 7 shows cam track 85A and half of each of several holders 36 (it should be understood that cam track 85 is symmetrically mounted on the other side of center line L of FIG. 7, and that each holder 36 has four adjustable pockets, each adjustable pocket defined by a pair of spring-loaded pocket members 58 and 60). When a holder 36 enters pitting head housing 22, it initially translates past the aligned input ends 89 of cam tracks 85 and 85A (as is the top holder 36 in FIG. 7). Since the distance between tracks 85 and 85A at input ends 89 is relatively large, each spring 62, mounted between the main body of holder 36 and carrier 54 (or 56) at the end of holder 36 to spring-load the pockets into their open configuration, is relaxed in its elongated configuration (and rods 50 extending between carriers 54 and 56 are elongated) when the holder translates past the input ends 89. Thus, the holder's pockets are in their open configuration (as are the pockets of the top holder 36 in FIG. 7).

Then, when each holder 36 advances between cam tracks 85 and 85A past the input ends 89, the separation between the cam tracks decreases, and so the action of the cam tracks on carriers 54 and 56 shortens rods 50 (and compresses springs 62) to move the pockets into their closed configuration (as are the pockets of the second holder 36 from the bottom of FIG. 7). In this state, the pitting knives engage the fruit gripped in the pockets to eject the pits from the fruit.

Then, when each holder 36 advances between the notched portions 85B of cam tracks 85 and 85A, the separation between the cam tracks increases, and springs 62 relax into their elongated state, thus lengthening the rods 50 and moving the pockets into their open configuration (as are the pockets of the bottom holder 36 shown in FIG. 7). The notched portions 85A are sized and positioned so that the pockets open briefly after the pit removal operation (while the pitting knives remain engaged with the fruit in the pockets) to improve the efficiency with which the knives are withdrawn from the fruit and the pitted fruit flesh is separated from the pockets, and the pockets then close as holders 36 continue to move along tracks 85 and 85A past notches 85B. When multiple rows of pitting knives simultaneously pit fruit in two or more holders 36, these holders sequentially translate past notches 85B but all do so while the pitting knives remain engaged with the pitted fruit carried by them (to improve the efficiency with which the pitted fruit flesh is separated from each of the holders carrying said flesh).

With reference again to FIG. 4, cams 80 are typically attached to the frame by adjustable mounts 82 so that the distance between cams 80 can be adjusted when desired (e.g., between processing of a batch of prunes of one average size and processing of another batch of prunes of a different average size). Similarly, cams 84 are attached to the frame by adjustable mounts 86, and cams 85 and 85A are attached to the frame by adjustable mounts 37 (shown in FIG. 4).

Hopper 14 (having sideplates 16 and endwall 10) of FIG. 1 is positioned so that the prunes, dates, or similar soft fruit to be pitted (e.g., prunes P shown in FIGS. 1 and 2) drop onto holders 36 as the holders pass under hopper 14. The FIG. 1 apparatus also includes hood 20 (which is supported above the upper end of hopper 14 and typically houses a water spray system for spraying water on the fruit translating past it) and paddle wheels 38. Paddle wheels 38 are rotatably mounted within hood 20, and are typically driven (by means not shown) to rotate sufficiently rapidly about their central axes (which are perpendicular to the plane of FIG. 1) so that the paddles of each wheel 38 sweep several times across each holder 36 as the holders 36 translate past the wheels 38. As indicated in FIG. 3, each time one of the paddles of wheel 38 sweeps across the pockets of a holder 36, protruding portions 78 of the paddle sweep through corresponding recesses 76 of the holder 36. Thus, paddle wheels 38 sweep out of the pockets any prunes (or other articles) that are not firmly seated (typically in a vertical orientation) between a pair of pocket members 58 and 60.

Each holder 36 has a lower plate 46 in which a pitting cup 70 is mounted at the location of each pocket (holder 36 shown in FIG. 3 has four cups 70, one at the location of each pocket). Pitting cups 70 are sometimes referred to as pitting rubbers, since they are typically made of rubber. Each cup 70 has a pit ejection opening 72 extending through it. Each holder 36 also has an upper plate 44 with a funnel-shaped opening 74 at the location of each pocket (for guiding an article into the pocket so as to rest on cup 70 between members 58 and 60). As shown in FIG. 3, one of conveyor chains 35 is attached to one side of plate 46 of each holder 36, and the other of chains 35 is attached to the other side of such plate 46.

In operation, prunes P (or dates or other articles to be pitted) fall from hopper 14 onto cups 70, as the conveyor translates holders 36 past the hopper, so that a prune (or other article) is loaded into each of at least some of the pockets defined by holders 36. The prunes (within holders 36) then translate past paddle wheels 38, and then through cam assembly 111 (shown schematically in FIG. 1). Assembly 111 comprises a pair of cam tracks 111A and 111B (also referred to herein as shaker bars), best shown in FIG. 2A.

Shaker bars 111A and 111B are cam tracks similar to above-described cam tracks 84, but each of bars 111A and 111B has periodically varying width and thus defines a scalloped (or other periodically varying) cam surface, whereas each cam 84 has uniform width (away from its ends) and thus defines a straight cam surface. Shaker bars 111A and 111B are mounted to sideplates 12 and 12A in positions in which they cause the pockets of each holder 36 to open and close rapidly and periodically as holders 36 translate past the shaker bars (i.e., as roller 66 of each holder 36 follows the cam surface of bar 111A and roller 68 of each holder 36 follows the cam surface of bar 111B). This periodic opening and closing of the pockets causes the articles to be pitted to settle completely into the pockets.

Assembly 111 also includes means for adjustably attaching shaker bars 111A and 111B to sideplates 12 and 12A of the frame. For example, adjustable mounts 186 (shown in FIG. 2A) can be provided, so that the distance between bars 111A and 111B can be adjusted when desired (e.g., in the same circumstances, described above, in which mounts 82 are adjusted to vary the spacing of cams 80). Alternatively, each of bars 111A and 111B is mounted to a plate (or angled bracket), and each plate (or bracket) has slots for receiving bolts for mounting the bar to the plate (bracket) and the plate (bracket) to the frame. When the bolts are loosened, each plate (bracket) can be repositioned relative to the frame (so that the slots translate relative to the bolts) and then fixed in the new position by re-tightening the bolts.

With reference again to FIG. 1, after holders 36 (and the prunes or other articles carried in their pockets) have translated past shaker bars 111 and into housing 22, a pitting knife assembly in housing 22 engages the translating prunes (or other fruit) to push out the pit from within each fruit.

The pits either fall directly into chute 83 (shown in FIG. 4), or they are brushed away from the holders by a rotating brush assembly (to be described with reference to FIG. 4) and then fall into chute 83. The rotating brush assembly comprises rotatably mounted pit brush 61 (having paddles tipped with rubber), brush drive sprocket 59, brush drive shaft 63 (to which brush 61 is attached), and brush drive chain 64 looped around sprocket 59 and shaft 63. Sprocket 59 and above-described pulleys 21B and 11B are mounted to the same rotatable shaft. In response to rotation of sprocket 59 (with pulleys 21B and 11B) by motor 24, chain 64 rotates shaft 63, thereby actively rotating brush 61 relative to each of holders 36 translating away from the pitting knives so that the paddles of brush 61 sweep away any pits that may cling to the holders (so that the pits fall into pit chute 83).

Alternatively, a fixed, pit wiper assembly is used in place of actively driven, rotatably mounted pit brush 61 (and shaft 63, drive sprocket 59, and brush drive chain 64). Such a wiper assembly may comprise two mounting bars, a mounting rod connected between the bars, and a wiping blade mounted to the rod, and may be fixedly mounted in a position above pit discharge chute 83 and just below the bottom surfaces of fruit holders 36, to wipe any clinging pits from each passing holder 36 as the holder translates above bin 83 following the operations of pitting and post-pitting disengagement of the pitting knives from the holder.

Following pitting, as the holders exit the pitting head, the pockets defined by each holder are opened by cam assembly 116 (comprising a pair of pocket-opening cam tracks similar to above-described cam tracks 80) shown schematically in FIG. 1, and the pockets are then shaken by passing through shaker bar assembly 113 (comprising shaker bars similar to above-described bars 111A and 111B), to cause the pitted prunes fall out of the pockets.

A pitting knife assembly mounted between plates 12 and 12A of housing 22 typically includes multiple rows of pitting knives (one row of knives for pitting fruit in each of two or more holders 36). Each row of pitting knives includes one knife for each pocket defined by one of the holders (e.g., one knife for each of the four pockets defined by holder 36). For example, in the apparatus of FIGS. 4, 8, and 15 there are two rows of pitting knives, each row comprising four knives 102. The pitting knives in one row pit the prunes in one holder 36 while the pitting knives in the other row simultaneously pits the prunes in another holder 36. A conventional implementation of such a knife assembly will next be described with reference to FIGS. 4 and 8-10, and an embodiment of the inventive knife assembly will later be described with reference to FIGS. 11-15.

The conventional pitting knife assembly of FIGS. 4, 8, and 9 includes two shafts 4 (one of which is shown in FIG. 4 and both of which are shown in FIG. 8) fixedly mounted between vertically oriented plates 12 and 12A of housing 22. A portion of the knife assembly hangs from shafts 4 in a manner to be explained below. The knife assembly also includes rotatably mounted drive shaft 21 which is rotated about its axis by belt 28, which is in turn driven by motor 24.

FIG. 8 is a cross-sectional view (in a vertical plane) of a portion of a conventional pitting knife assembly. FIG. 9 is a cross-sectional view (along line 9-9 of FIG. 8) of the FIG. 8 assembly (with several elements omitted for clarity). The assembly of FIGS. 8 and 9 employs box cam 109 to move a rocker arm assembly reciprocally (both up and down). Rather than a box cam, other conventional pitting knife assemblies employ an open cam (to move a rocker assembly down during part of its cycle) and springs (to move the rocker assembly up during the remaining part of its cycle).

Member 114 is fixedly attached to a carriage comprising upper carriage plate 7, lower carriage plate 132, and tie bar 30. The carriage hangs from a pair of rotatably mounted swing arms 2'. The upper end of each arm 2' is rotatably attached to one of parallel shafts 4. A pin 119 protrudes from the lower end of each arm 2' into a tube 120. Both tubes 120 are fixedly attached to lower carriage plate 132. Thus, as the carriage rocks back and forth (in response to rotation of eccentric 42'), the carriage imparts this rocking motion to tubes 120 and pins 119, thus causing arms 2' to swing back and forth on fixed shafts 4. More specifically, as the carriage rocks, pins 119 translate reciprocally as a unit with tubes 120. During the reciprocal translation of pins 119 together with tubes 120, each pin 119 rotates relative to the tube 120 which surrounds it (about the common axis of the pin and the surrounding tube).

Two parallel plunger shafts 15 extend through upper carriage plate 7 and lower carriage plate 132, each with freedom to translate in the direction of its longitudinal axis relative to the plates 7 and 132. A pitting knife assembly (including two rows of pitting knives 102) is fixedly attached to the lower ends of shafts 15. Thus (assuming for the moment that shafts 15 are held fixed relative to the carriage), as the carriage (including plates 7 and 132) rocks back and forth, shafts 15 translate reciprocally as follows: the center of gravity of each shaft 15 translates back and forth along an arc of a circle in the plane of FIG. 8, but neither shaft 15 rotates (about its center of gravity) in the plane of FIG. 8.

However, the actual motion of shafts 15 (and the knives 102 fixedly attached thereto) is more complicated, because a mechanism (including cam 109 and rocker arm unit 133) is provided to reciprocate shafts 15 longitudinally relative to the carriage as the carriage rocks back and forth. Unit 133 includes top rocker arms 43 and 43A, rocker spacers 40, and bottom rocker arms 45, to be described below). The longitudinal motion of shafts 15 is timed relative to the swinging motion thereof (by the orientation of cam 109 relative to that of eccentric 42'), so that the knives 102 undergo the following motion: knives 102 move longitudinally downward (into engagement with the prunes to be pitted) while the carriage swings in the direction of motion of the prunes (which corresponds to "toward the right" in FIG. 8), knives 102 then move longitudinally upward (until they are out of engagement with the prunes) while the carriage continues to swing in the direction of motion of the prunes, knives 102 then continue to move longitudinally upward while the carriage begins to swing in opposite direction (toward the left in FIG. 8), and finally knives 102 begin to move longitudinally downward (toward a new set of prunes to be pitted) while the carriage continues to swing in the direction opposite the direction of motion of the prunes.

Each knife 102 preferably has a groove 102A (a small diameter portion) near its tip as shown in FIG. 8. Each groove 102A defines shoulders which engage the fruit flesh when the knife is being withdrawn after pitting (to assist in separating the pitted fruit from the holder).

As shown in FIG. 8, box cam 109 is fixedly mounted to shaft 21 (at a different location along the axis of shaft 21 than the location at which eccentric 42' is fixedly mounted) using set screw 176, key 177 and split clamp 115 (clamp 115 has two portions which can be tightened together) shown in FIG. 8. To mount cam 109 to shaft 21, key 177 is inserted in shaft 21. Then set screw 176 is inserted through a channel in cam 109 into a tapped hole in cam 109, and both the first and second portions of split clamp 115 are inserted in another channel in cam 109. Cam 109 is then positioned with respect to shaft 21 so that a hole in cam 109 is aligned with key 177. Then, set screw 176 is advanced through the hole into engagement with key 177. To lock box cam 109 onto shaft 21, screw 176 is tightened against key 177 in shaft 21 and box cam 109, and the second portion of clamp 115 is tightened against shaft 21 and the first portion of clamp 115.

Box cam 109 has a groove (a recessed portion) in each of its side faces. Each groove defines an outer cam surface 9A and an inner cam surface 9C opposed to the outer cam surface. Cam surfaces 9A and 9C of one side face of cam 109 define an oblong, closed first cam track (as shown in FIG. 8). Cam surfaces 9A and 9C of the other face of cam 109 define an oblong, closed second cam track which is a mirror image of the first cam track.

One cam follower 140 attached to upper arm 43 of rocker arm unit 133 between the fixed end of unit 133 (the end attached to pin 112) and the free end of unit 133 rides between cam surfaces 9A and 9C of the first cam track. Another cam follower 140 attached to upper arm 43A of rocker arm unit 133 between the fixed end of unit 133 (the end attached to pin 112) and the free end of unit 133 rides between cam surfaces 9A and 9C of the second cam track. The first and second cam tracks are aligned, so that one cam follower 140 is always directly below (into the plane of FIG. 8) the other cam follower 140 when the knife assembly is viewed from the viewpoint of FIG. 8.

Box cam 109 has a removable insert portion which defines part of outer cam surfaces 9A when the box cam 109 is initially installed. The insert portion is removed from the rest of cam 109 to allow assembly of rocker arm unit 133 with box cam 109 (so that cam followers 140 ride properly between cam surfaces 9A and 9C of each cam track of cam 109). After cam 109 and unit 133 have been assembled together, the insert is reinstalled back to its original position.

A cam follower 23 protrudes from each of shafts 15 into engagement with unit 133 (near unit 133's free end) as shown in FIGS. 8 and 9.

Since each cam follower 140 always rides between an upper and a lower cam surface of cam 109 (regardless of the rotational orientation of shaft 21 and cam 109), cam 109 exerts an upward force on cam followers 140 (and thus on unit 133) during some portions of the rotational cycle of cam 109 and cam 109 exerts a downward force on cam followers 140 (and thus on unit 133) during the other portions of cam 109's rotational cycle. In particular, when the large radius portion of the aligned cam tracks (the cam track portion along which inner cam surfaces 9C are radially farthest from the central longitudinal axis of shaft 21) engages cam followers 140, cam 109 pushes followers 140 down, thus pivoting arm unit 133 counterclockwise about pin 112 (in the plane of FIG. 8), which causes arm unit 133 to force cam followers 23 downward, which in turn translates shafts 15 longitudinally downward relative to the carriage. Then, when continuing rotation of shaft 21 rotates the small radius portion of the aligned cam tracks (the cam track portion along which inner cam surfaces 9C are radially nearest to the central longitudinal axis of shaft 21) engages cam followers 140, cam 109 pushes followers 140 up, thus pivoting arm unit 133 clockwise about pin 112 (in the plane of FIG. 8), which causes arm unit 133 to force cam followers 23 upward, which in turn translates shafts 15 longitudinally upward relative to the carriage.

When installed, rocker arm unit 133 has freedom to pivot relative to pin 112 about the axis of pin 112. Stroke adjusting support bar 11' is fixedly attached to frame plate 12A. Before operating the apparatus, stroke adjustment bearing screw 110' can be repositioned relative to bar 11' in order to change the position of pin 112 and unit 133 (and thus shafts 15 engaged with unit 133) relative to frame plate 12A (and the entire frame of the apparatus) during operation.

Unit 133 includes upper arms 43 and 43A and lower arms 45 (there are two arms 45, only one of which is shown in FIG. 8). One end of each of upper arms 43 and 43A and lower arms 45 is fixedly attached to body member 149, and spacer 150 is connected between arms 43 and 43A. Tie bar 49 and spacers 40 are connected between the other ends (the "free" ends) of arms 43, 43A, and 45, with bar 49 connected between the free ends of arms 43 and 43A (as best shown in FIG. 9), one spacer 40 connected between the free ends of arm 43 and the arm 45 below arm 43, and the other spacer 40 connected between the free ends of arm 43A and the arm 45 below arm 43A.

Preferably, the cam follower 140 rotatably attached to each of arms 43 and 43A (as best shown in FIG. 22) includes a roller (for engaging cam tracks of box cam 109) rotatably mounted to a threaded shaft. To mount the cam follower to arm 43 or 43A, the shaft is inserted through a hole in the arm and a nut is threaded onto the shaft to retain the cam follower in place. Preferably, a grease fitting 152 is provided at the location of each cam follower 140, to enable lubrication of the cam followers.

In operation of the knife assembly, cam followers 140 ride in the cam tracks of box cam 109, thus forcing unit 133 to pivot relative to fixed pin 112 and screw 110'. As unit 133 pivots (clockwise or counterclockwise with respect to the central axis of pin 112), unit 133 drives shafts 15 longitudinally up or down, as follows. A cam follower 23 protrudes from one shaft 15 into the space between arm 43 and arm 45 below arm 43, and another cam follower 23 protrudes from the other shaft 15 into the space between arm 43A and arm 45 below arm 43A. Thus, cam followers 23 engage arms 43, 43A, and 45, and these arms force cam followers 23 up and down as they pivot with the rest of unit 133.

As unit 133 undergoes reciprocating pivoting motion in response to rotating box cam 109, the entire carriage assembly (including shafts 30, 15, and 114 and carriage plates 7 and 132) undergoes rocking motion in response to rotating eccentric 42'. More specifically, eccentric 42' is attached (at a bearing) to shaft member 114, with eccentric 42' having freedom to rotate relative to member 114. Cam 109 and eccentric 42' are fixedly mounted to shaft 21 (at different locations along the axis of shaft 21). As eccentric 42' rotates with shaft 21, eccentric 42' exerts force on member 114 which causes member 114 to undergo reciprocating motion as follows: the center of gravity of member 114 translates back and forth along an arc of a circle in the plane of FIG. 8, but member 114 does not rotate (about its center of gravity) in the plane of FIG. 8. This rocking motion of the carriage imparts a rocking component to the motion of shafts 15 (perpendicular to the longitudinal axes of shafts 15), which enables shafts 15 to translate knives 102 so as to follow translating specimens of fruit during periods when cam 109 is forcing shafts 15 (and thus knives 102) longitudinally downward into engagement with the fruit.

FIG. 10 is a graph representing the vertical position of the tip of one of the pitting knives 102 of the FIG. 8 assembly, as a function of time. FIG. 10 shows that the vertical position of the knife tip is cyclical, with pitting occurring at times t1 and t2. As is apparent from inspection of FIG. 10, the knife tip moves (vertically) very rapidly downward toward its lowest position (at each of pitting times t1 and t2), and very rapidly upward from its lowest position.

Next, we describe the pitting operation in more detail (in an implementation in which motor 24 continuously translates holders 36 around the loop defined by sprocket assemblies 32C, 32D, and 34). FIG. 5 shows a holder 36 and one row of four knives 102 in their lowest position (extending all the way through pitting rubbers 70 of the four pockets defined by the holder), in the position the knives would occupy immediately after pushing pits downward (through rubbers 70) from within four articles of fruit seated in the pockets. FIG. 6 shows one knife 102 of each of the two rows of knives 102, also in the lowest knife position. For clarity, portions of some of the holders 36 mounted on chains 35 are not shown in FIG. 6 (only the pitting rubbers 70 of the partially-shown holders 36 are visible in FIG. 6).

As shown in FIGS. 5 and 6, fruit stripping grill 94 is mounted (by brackets 94A) between plates 12 and 12A. After the pitting operation, knives 102 retract upward and to the right (when viewed as in FIG. 6) from vertically fixed holders 36 through holes in the fixedly mounted grill 94. Typically, most (or all) of the pitted fruit flesh falls from the knives 102 before the knives 102 reach grill 94. The grill 94 strips any pitted fruit flesh which clings to the retracting knives 102. The pitting knives 102 then move back to the left (when viewed as in FIG. 6) away from grill 94. The holders (with pitted fruit) then translate to cam assembly 116 (which opens the spring-biased pockets of each holder) and then to cam assembly 113 (which shakes the pitted fruit from the pockets) so that the pitted fruit fall from the holders into a product bin or conveyor (not shown). Optionally, water is sprayed on the pitted fruit and on grill 94 (e.g., from spray pipe 37 and spray nozzle 48 shown in FIG. 4).

Following pitting, as holders 36 exit the pitting head, the pockets defined by each holder are opened by cam assembly 116 (comprising a pair of pocket-opening cam tracks) and the pockets are then shaken by passing through shaker bar assembly 113 (comprising a pair of cam tracks known as shaker bars) to cause the pitted prunes fall out of the pockets.

With reference to FIG. 5, cam tracks 85 and 85A (each mounted to one of plates 12A of housing 22 as shown in FIG. 5) are separated in the plane of FIG. 5 by a relative small distance, so that the pockets defined by holders 36 are closed to grip tightly the fruit being pitted. After the pitting step, each holder 36 of FIGS. 5 and 6 continues to translate (out of the plane of FIG. 5; toward the right in FIG. 6) until the holder (e.g., the holder 36 shown in FIG. 5) encounters aligned notches 85B in cam tracks 85 and 85A (notch 82B in cam track 85A is shown in FIG. 7). While each holder 36 translates between notches 85B, the holder's springs (springs 62, described with reference to FIG. 3) briefly relax and are then re-compressed (thereby briefly opening the pockets). Knives 102 (which extend through the fruit in each pocket of the holder at the end of the pitting step) begin to translate upward while the pockets are briefly open. The brief opening of each pocket (in response to relaxation of the springs) releases pressure on the pitted fruit in each pocket, thereby allowing upward-translating knives 102 to strip the fruit from pitting rubbers 70 of the pockets before the pockets return to their closed configuration. This action improves the efficiency of separation of the pitted fruit from the holders (by assemblies 116 and 113) following pitting.

Some conventional variations on the above-described pitting apparatus employ an intermittent fruit holder conveyor drive mechanism. In such variations, the fruit holders are translated into position for pitting, then remain stationary during pitting, and are then translated away from the pitting position. For example, sprockets 32C of the FIG. 1 system could implement a cam indexing mechanism to drive fruit holder conveyer chains 35 in such an intermittent manner while motor 24 drives the pitting knives continuously.

It had not been known until the present invention how to design an apparatus for pitting prunes or dates (or similar soft fruit) in a manner overcoming the disadvantages and limitations of conventional pitting systems (including those including open cam or box cams in their pitting knife drive assemblies).

SUMMARY OF THE INVENTION

In a class of embodiments, the invention is a pitting knife assembly including: a pitting knife mount; and a pulley drive assembly coupled to the pitting knife mount and configured to move the knife mount around a circular (or substantially circular) path. During operation of the pitting knife assembly with at least one pitting knife (e.g., a set of pitting knives) mounted to the pitting knife mount and a fruit conveying assembly positioned and configured to convey fruit to the pitting knife assembly, the pitting knife can produce pitted fruit by moving into engagement with fruit conveyed by the conveying assembly (to pit the fruit) as the pitting knife mount moves through a first portion of the path, and the pitting knife can then move out of engagement with (and away from) the pitted fruit as the pitting knife mount moves through a second portion of the path. Typically, the pitting knife assembly includes a frame, a drive shaft assembly (which may include a drive shaft and at least one drive pulley coupled to the drive shaft) rotatably mounted to the frame, at least one pair of pulleys coupled to and drivable by the drive shaft assembly, and a connector (typically a connector rod) rotatably connected between the pulleys of each said pair so as to remain oriented at least substantially parallel to a line through the centers of the pulleys of the pair while the pulleys are driven by the drive shaft assembly, and the pitting knife mount is coupled to the connector such that said connector moves the pitting knife mount around the at least substantially circular path when each said pair of pulleys is driven by the drive shaft assembly.

In a second class of embodiments, the invention is a fruit pitting apparatus including a pitting knife assembly and a conveying assembly positioned and configured to convey fruit to the pitting knife assembly. The pitting knife assembly includes at least one pitting knife, and a pulley drive assembly coupled and configured to move the pitting knife around an at least substantially circular path. In operation, the pitting knife assembly can produce pitted fruit by moving the pitting knife into engagement with fruit conveyed by the conveying assembly (to pit the fruit) as the pitting knife moves through a first portion of the path, and the pitting knife can then move out of engagement with (and away from) the pitted fruit as the pitting knife moves through a second portion of the path. Typically, the fruit pitting apparatus is configured to remove pits from prunes (or similar soft fruit such as dates) and the conveying assembly is configured to seat the fruit in holders and translate the fruit and holders (typically intermittently, but continuously in some alternative embodiments) past the pitting knife assembly.

Typically, the conveying assembly includes fruit holders and is configured to move the fruit holders intermittently relative to the pitting knife assembly (e.g., sprockets 32C of the conveying assembly of FIG. 15, or an assembly associated therewith, includes a cam driven indexer that is configured to move fruit holders 36 intermittently relative to the pitting knife assembly). Preferably, the conveying assembly includes a cam driven indexer for timing motion of fruit holders relative to the pitting knife assembly, and the cam driven indexer is configured to move the fruit holders at a forward speed that matches the forward speed of each pitting knife of the pitting knife assembly (while the pitting knife moves into engagement with fruit in one of the holders and pits the fruit), and then to stop each said fruit holder after pitting to allow the pitting knife assembly to rotate the pitting knife up, around and back down for another pitting index.

Typically, the pitting knife assembly (in the second class of embodiments of the inventive apparatus) includes a frame, and a knife mount to which each said pitting knife is mounted, and the pulley drive assembly includes a drive shaft assembly (which may include a drive shaft and at least one drive pulley coupled to the drive shaft) rotatably mounted to the frame, at least one pair of pulleys coupled to and drivable by the drive shaft assembly, and a connector (e.g., a connector rod) rotatably connected between the pulleys of each said pair to remain oriented at least substantially parallel to a line through the centers of the pulleys of the pair while the pulleys are driven by the drive shaft assembly, and the pitting knife mount is coupled to the connector such that said connector moves the pitting knife mount around the at least substantially circular path when each said pair of pulleys is driven by the drive shaft assembly.

In some embodiments, the invention is a pitting knife drive system including pitting knives. The pitting knife drive system is configured to be mounted in a fruit pitting apparatus including fruit holders and a conveyor system for translating the fruit holders. The pitting knife drive system is configured to drive the pitting knives relative to the holders, the conveyor system is configured to drive the holders intermittently, and the pitting knife drive system and the conveyor system are configured to translate the knives with the holders during pitting and to keep the holders stationary when the pitting knife drive system lifts the pitting knives out of the holders after pitting. The pitting knife drive system typically includes a knife mount (to which the pitting knives are mounted) and a set of timing pulleys on each side of the knife mount. Each said set of timing pulleys is synchronized by a connecting rod and a timing belt which drives the timing pulleys together. Each said connecting rod is held in a fixed orientation (e.g., a vertical orientation) by the synchronized rotation of the timing pulleys, where this orientation is at least substantially perpendicular to the path of advancing fruit being conveyed in the holders. As the pulleys rotate the connecting rod, the attached knife mount will raise and then lower into the holders to push the pits out of fruit therein. The timing belts are typically driven by a common drive shaft which drives two additional timing pulleys, one for each set of synchronized timing pulleys, so as to rotate the two sets of pulleys together and to keep the knife mount aligned with the path of the fruit holders. The conveyer system is preferably driven by an indexer to synchronize the movement of the holders with the pitting knives.

In some embodiments, the invention is an apparatus for removing pits from prunes (or similar soft fruit such as dates), including a pitting knife drive assembly, a knife set (including one or more pitting knives) driven by the drive assembly, and a conveyor assembly for seating the fruit in holders and translating the fruit and holders (continuously or intermittently) past the knife set. The pitting knife drive assembly includes: a pair of pulleys (typically identical disks) positioned vertically with respect to each other. A bearing shaft (or other cam follower) extends out from each of the pulleys (e.g., from a hole in each of the pulleys) in a position located away from the center of said each of the pulleys. With the cam followers aligned at the same azimuthal angle (about the centers of the pulleys from which they extend), a connector (e.g., a connector rod) is attached to the cam followers. Then, as the pulleys of each pair are driven together, the connector moves around a circular path while remaining in a parallel alignment with respect to a line between the pulleys' centers. With such a connector attached to each side of the knife set, the knife set is moved in a circular path which is timed with the continuous or intermittent motion of the conveyer assembly translating the fruit past the knife set. In preferred embodiments, the holders are driven (by a cam indexer drive unit) intermittently through a pitting area, and the knife driving assembly has a single, driven, drive shaft which drives two attached timing pulleys, one on each side of the knife set. These timing pulleys drive timing belts which in turn drives two pairs of additional timing pulleys (which are sometimes referred to as disks, and are typically larger than the timing pulleys attached to the drive shaft). The disks in each pair are aligned with one vertically below the other, and their centers form a perpendicular line to the holders' translating direction. A cam follower is mounted to each disk (e.g., each disk has a hole in which a cam follower is mounted), and these cam followers are aligned with timing pulley teeth so that when assembled with a connector rod between the cam followers and a timing belt driving the disks, the connector rod's orientation is fixed parallel to a line between the disks' centers and perpendicular to the holders' translating direction. One set of these timing belt drive assemblies is on each side of the knife set, for driving the pitting knives in a smooth circular motion.

Typical embodiments of the inventive knife drive mechanism have the following advantages over conventional box cam (or open cam) knife drive mechanisms:

they drive the pitting knives such that their motion profile (along an axis perpendicular to the translating direction of the fruit holders) is a smooth sinusoidal motion (in contrast with the convention motion profile which includes a steep acceleration, a sudden direction change, and typically bouncing in or on the cam); and the total part count is reduced (e.g., from 71 to 52 parts, representing a 25% decrease in parts) and the number of different parts is reduced (e.g., from 32 to 11 parts, representing a reduction of 65%), resulting in cost savings for parts and assembly and maintenance labor.

BRIEF DESCRIPTION OF THE DRAWINGS

FIG. 15 is an exploded view of the apparatus in the sense that its pitting knife assembly is shown enlarged relative to, and separated from, the rest of the apparatus. When the apparatus is fully assembled, pitting knife mount 301 can position pitting knives 102 in a lowered position (shown in phantom view) relative to fruit holders 36.

DETAILED DESCRIPTION OF THE PREFERRED EMBODIMENTS

A preferred embodiment of the inventive pitting knife assembly will be described with reference to FIGS. 11-15. The prune pitting apparatus of FIG. 15 includes the knife drive assembly of FIGS. 11-14.

All elements of the apparatus of FIGS. 11-15 which are identical to corresponding elements of the apparatus of FIGS. 1-7 are identically numbered in FIGS. 1-7 and 11-15 and the foregoing description thereof will not be repeated with reference to FIGS. 11-15.

Figure 15:
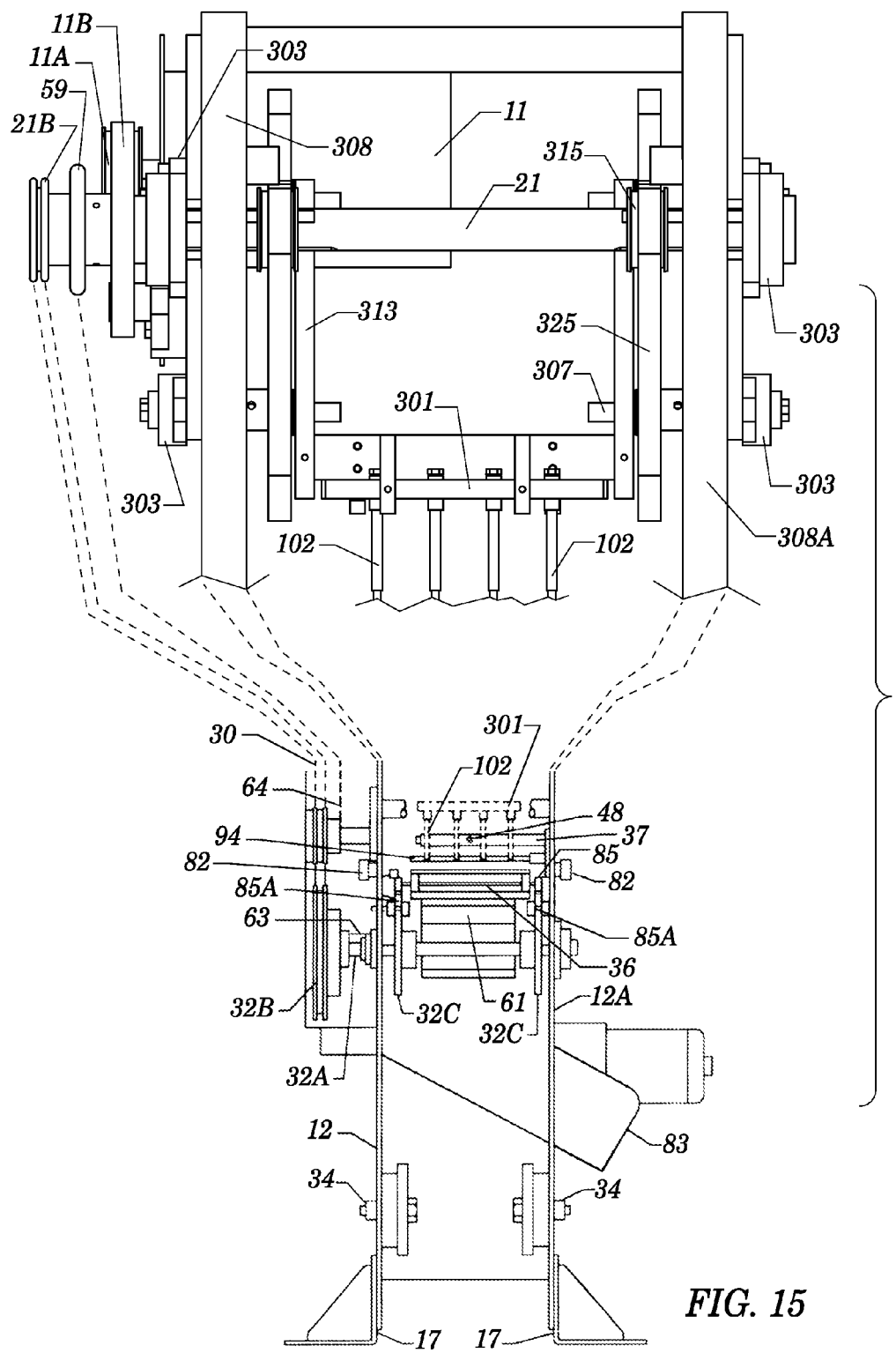
FIG. 15 is an end elevational view of a prune pitting apparatus whose pitting knife assembly is identical to the FIG. 12 assembly.

The pitting knife assembly of FIGS. 11-14 includes a frame having side portions 308 and 308A. The pitting knife assembly is designed to be mounted to a conveyor assembly of a prune pitting apparatus. For example, it can be mounted to the conveyor assembly of the prune pitting apparatus of FIGS. 1-7 (which is identical to the conveyor assembly of the FIG. 15 apparatus), with side frame portion 308 aligned with and attached to side plate 12 of the conveyor assembly and side frame portion 308A aligned with and attached to side plate 12A of the conveyor assembly as indicated in FIG. 15.

Figure 1:
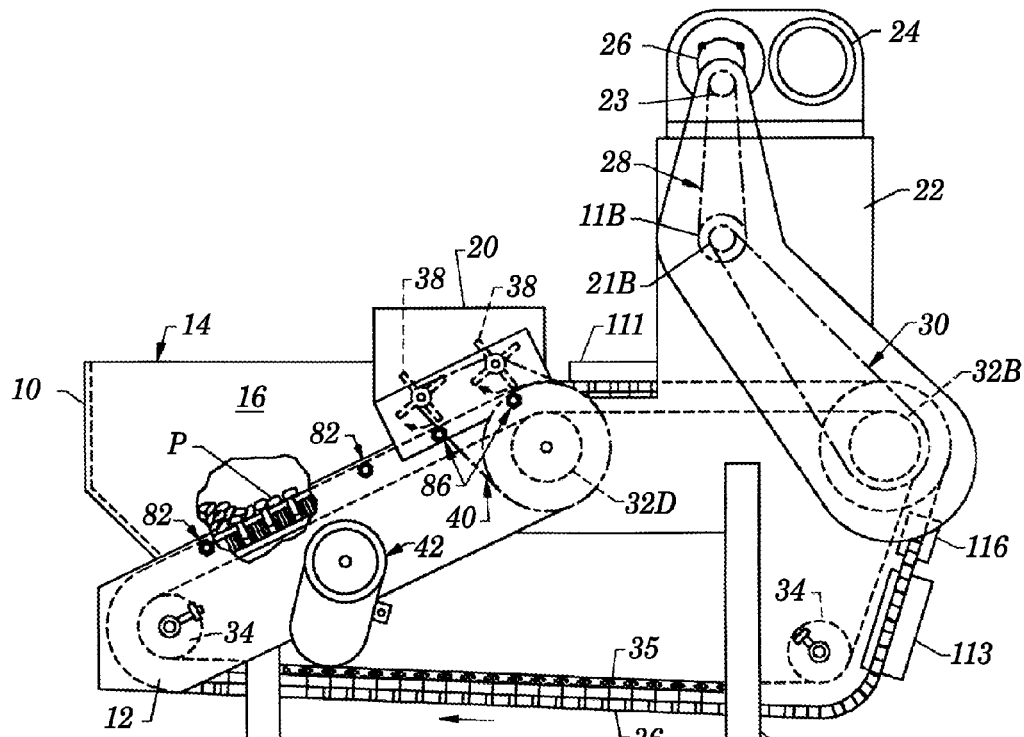
FIG. 1 is a side elevational view (partially cut away) of a conventional prune pitting apparatus.
Figure 2:
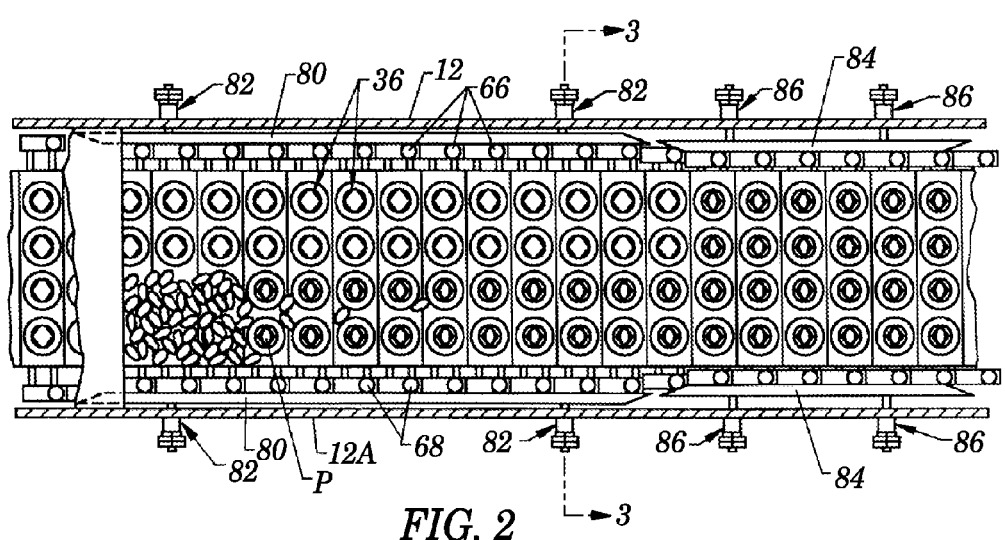
FIG. 2 is a cross-sectional view of a portion of the prune pitting apparatus of FIG. 1, taken along line 2-2 of FIG. 1.
Figure 2A:
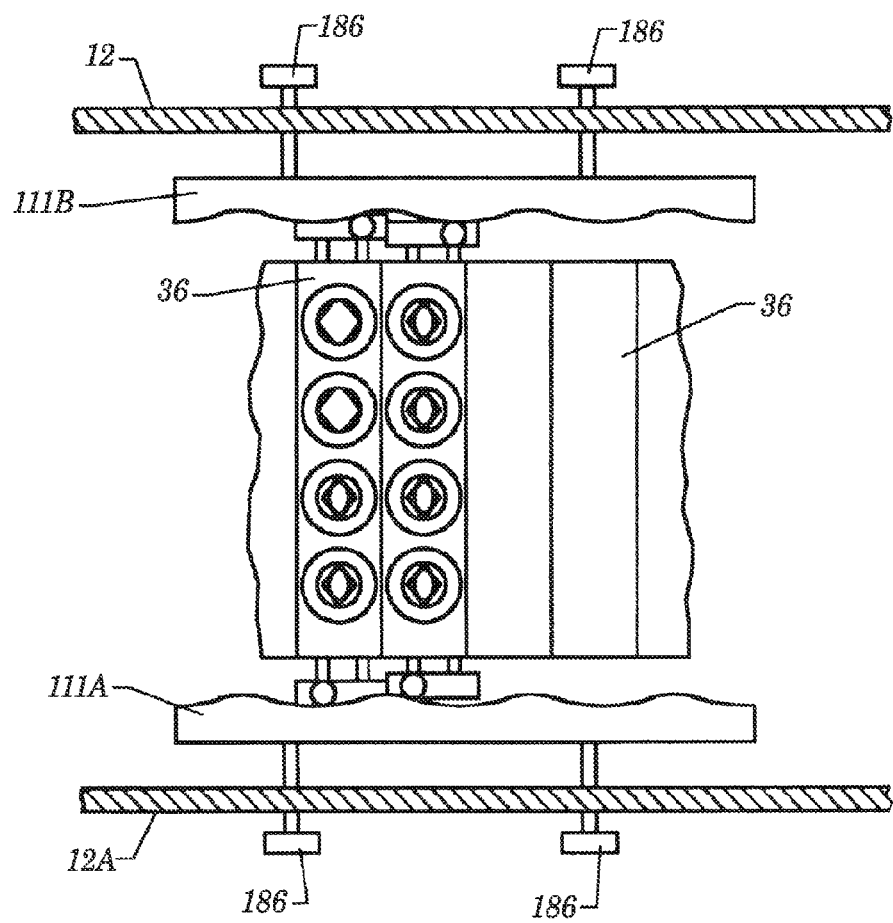
FIG. 2A is a cross-sectional view of a portion of the prune pitting apparatus of FIG. 1, taken along line 9-9 of FIG. 1.
Figure 3:
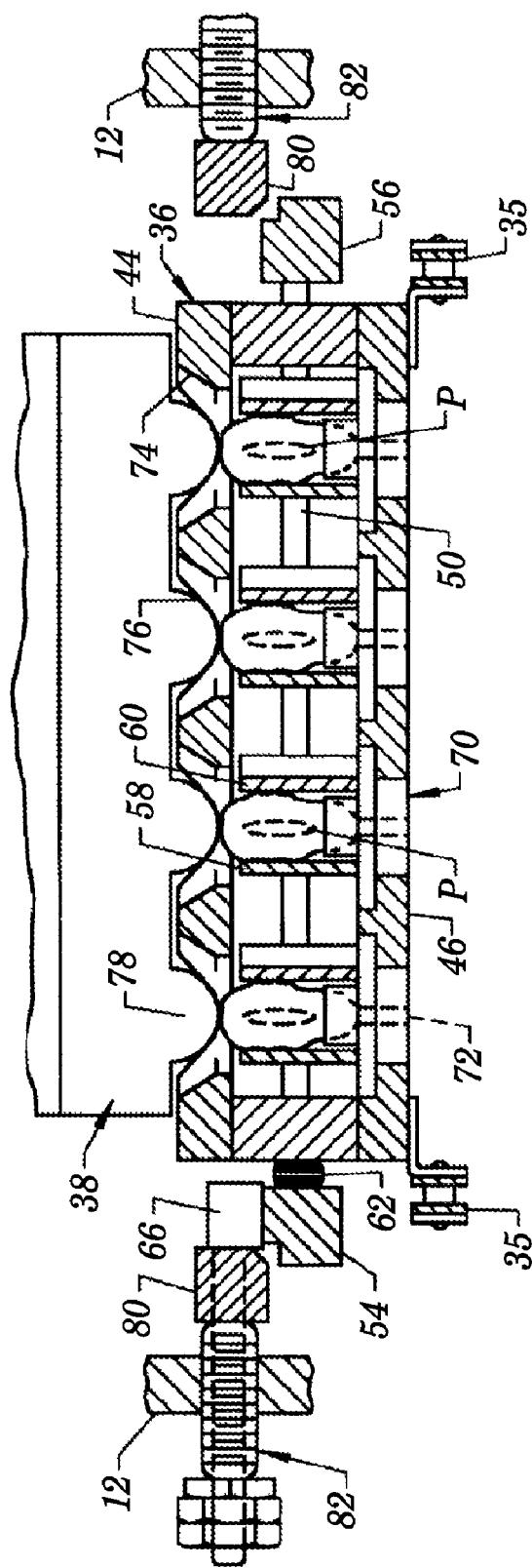
FIG. 3 is a cross-sectional view of the apparatus of FIG. 2 (with roller 68 omitted for clarity), taken along line 3-3 of FIG. 2, showing one of paddle wheels 38 sweeping across the pockets of one fruit holder 36.
Figure 4:
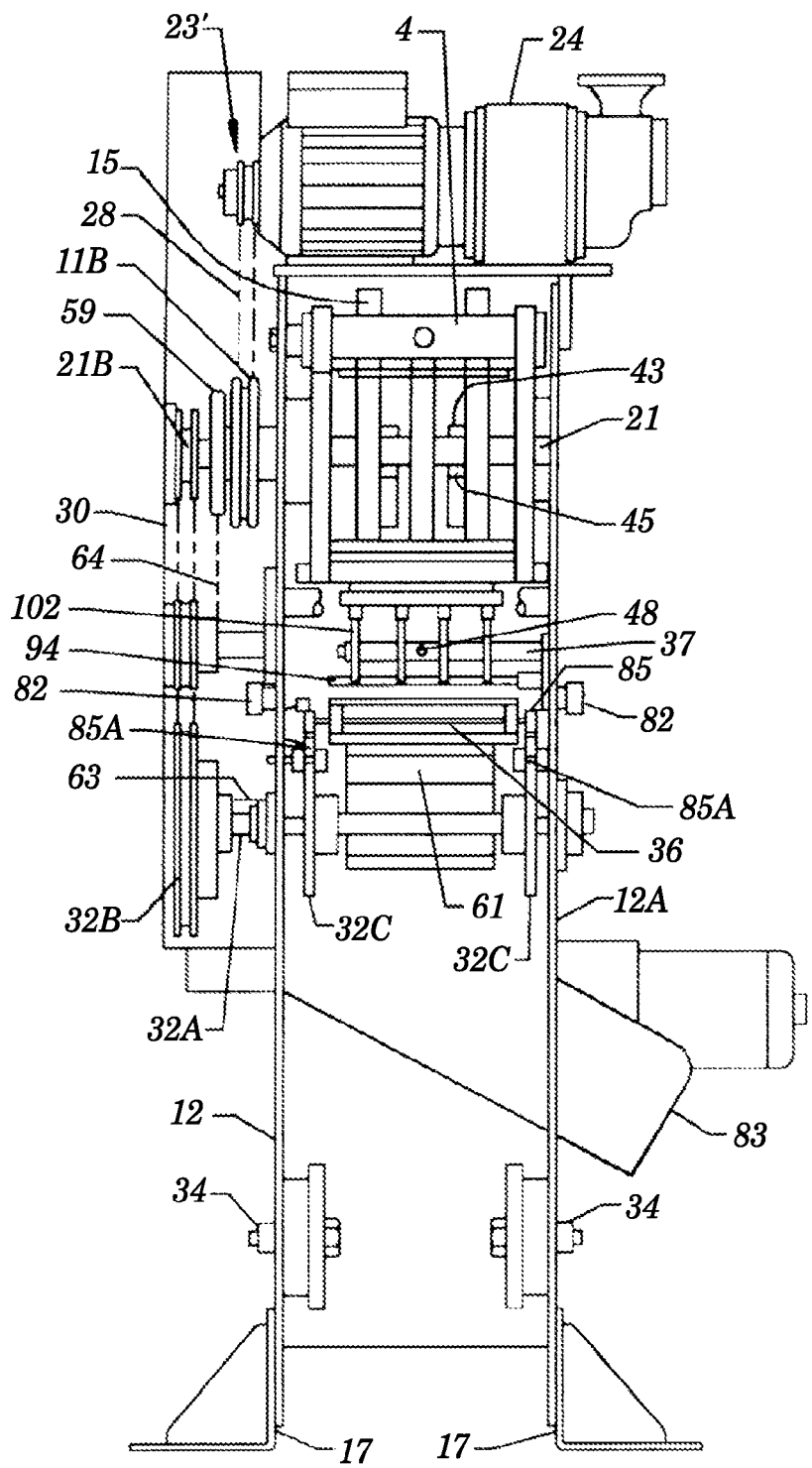
FIG. 4 is an end elevational view of the FIG. 1 apparatus (with pitting knives 102 in a lowered position).
Figure 5:
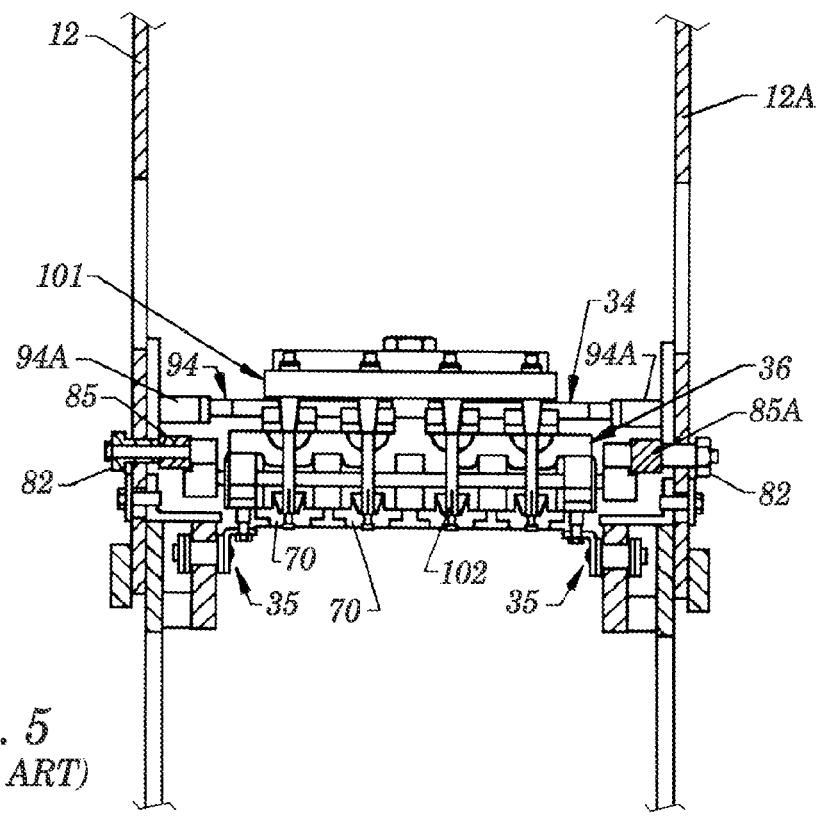
FIG. 5 is an enlarged view of a portion of the FIG. 4 assembly.
Figure 6:
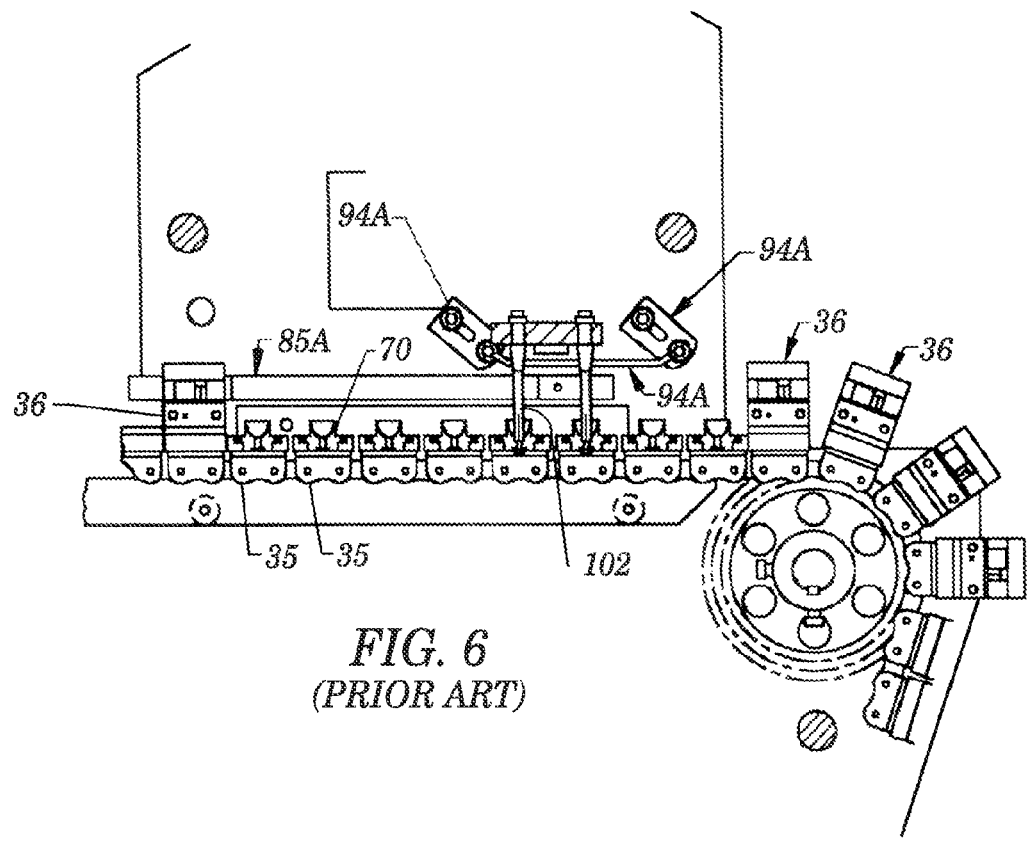
FIG. 6 is a cross-sectional view of a portion of the FIG. 4 assembly (in a vertical plane perpendicular to the plane of FIG. 4).
Figure 7:
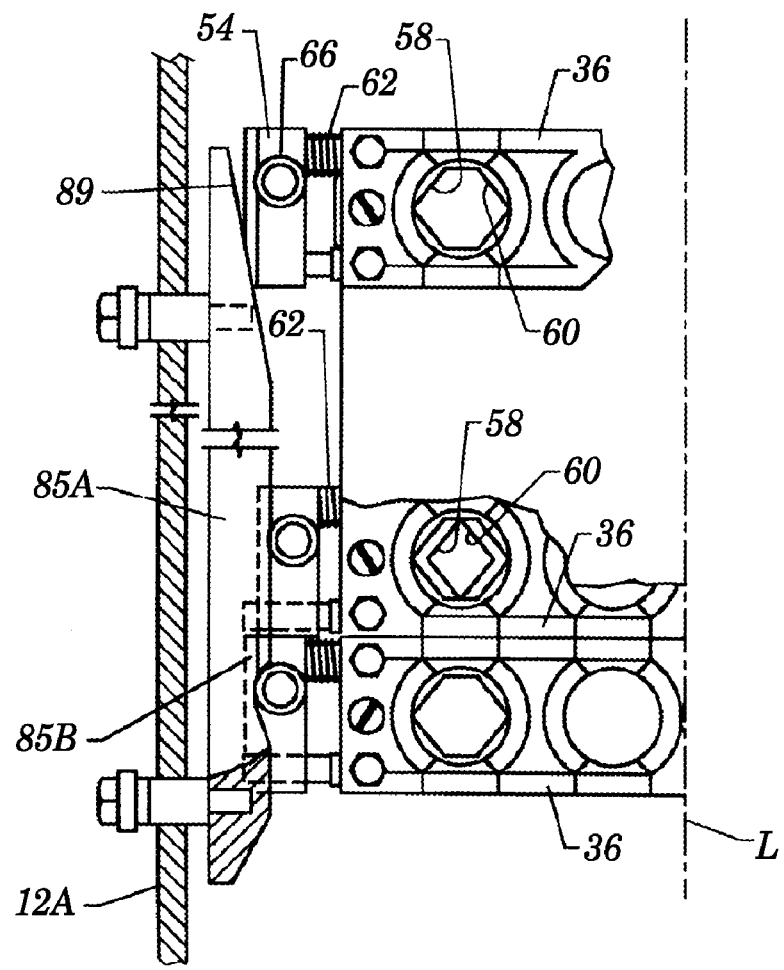
FIG. 7 is a top elevational view of a portion of an implementation of the FIG. 1 apparatus which shows notched implementations of cam tracks 85 and 85A.
Figure 8:
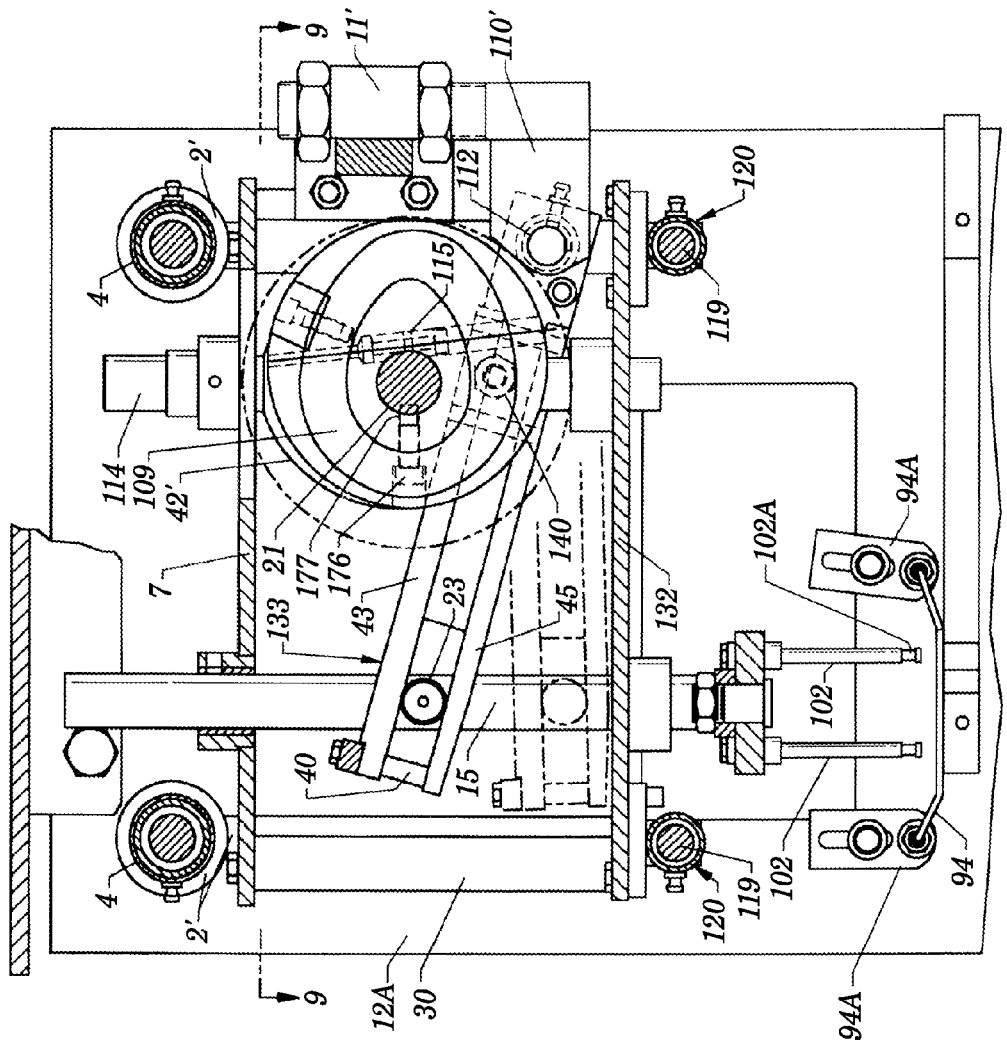
FIG. 8 is a cross-sectional view (in a vertical plane) of a portion of a conventional pitting knife assembly which can be mounted in pitting head knife assembly 22 of FIGS. 1 and 4).
Figure 9:
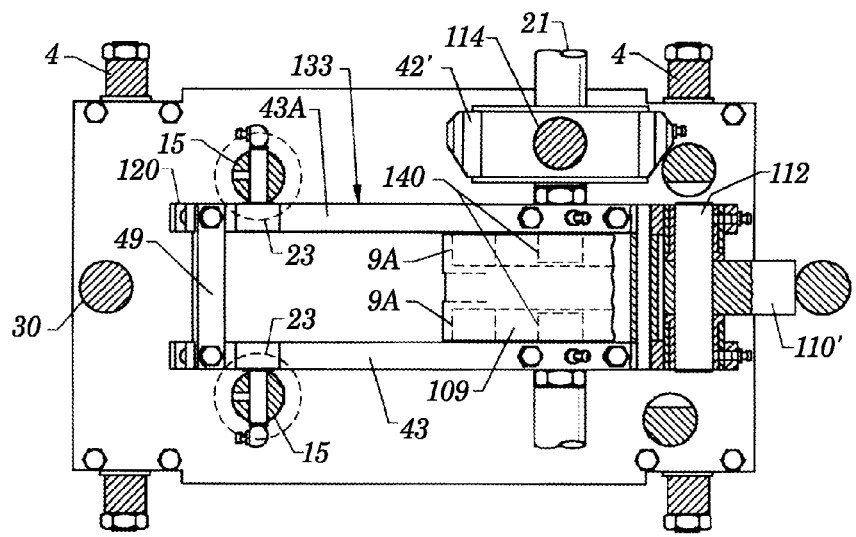
FIG. 9 is a cross-sectional view (along line 9-9 of FIG. 8) of the FIG. 8 assembly (with several elements omitted for clarity).
Figure 10:
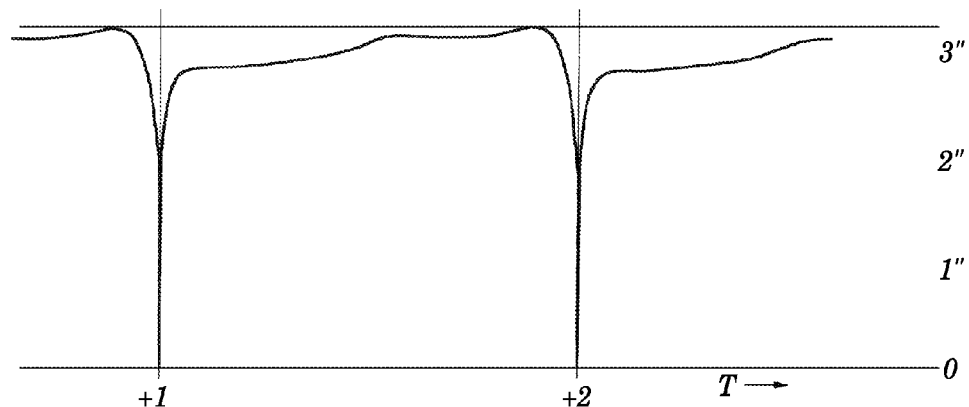
FIG. 10 is a graph representing the path of the tip of one of the pitting knives of the FIG. 8 assembly.
Figure 11:
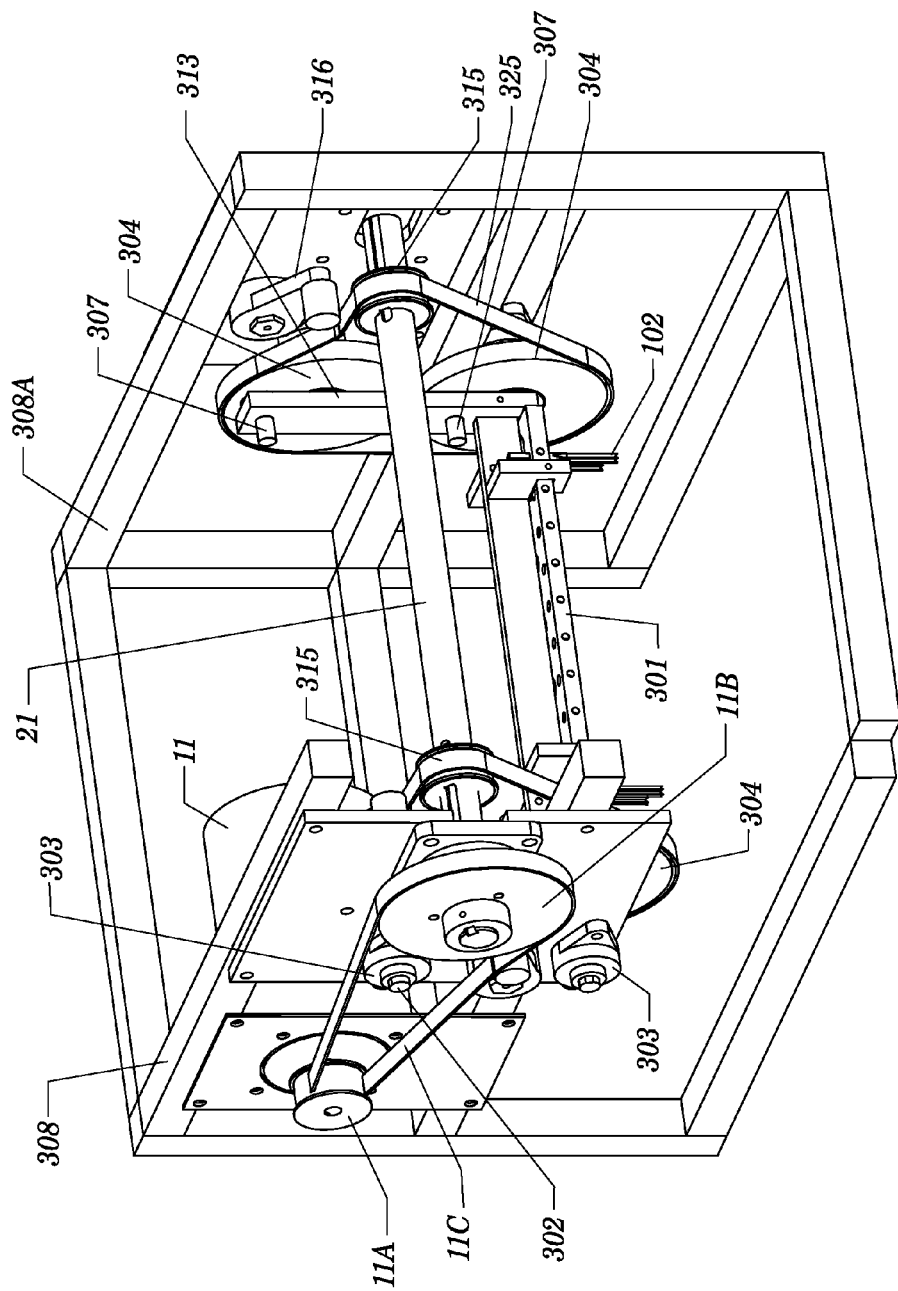
FIG. 11 is a perspective view of an embodiment of the inventive pitting knife assembly.

We next describe one side of the pitting knife assembly of FIGS. 11-14; the other side is a mirror image of it (since the assembly is symmetric about a vertical plane through its center). Two shafts 302, one directly above the other, are attached to side frame portion 308 (and two identical shafts 302 are attached to side frame portion 308A) with roller bearings 303 which allow shafts 302 to rotate freely relative to the frame. Pulleys 304 are slid onto shafts 302 (one pulley 304 on each shaft 302) and fastened with set screws to prevent sliding. When the apparatus is assembled, pulleys 304 are free to rotate with shafts 302. Each pulley 304 has a precisely drilled hole for receiving a cam follower 307. With a cam follower 307 pressed into each pulley 304, the vertically aligned pulleys 304 are rotated to align cam followers 307 at the same azimuthal angle about the center of the pulley 304 to which it is mounted (as shown in FIG. 11). Connecting rod 313 is then slid onto the aligned cam followers 307 and secured with a nut on the end of each cam follower 307. Cam followers 307 are rotatable relative to rod 313, so that rod 313 remains vertically oriented while timing belt 325 (to be described below) rotates pulleys 304 about their centers. The described assembly steps are repeated to assemble the corresponding elements on the other side of the apparatus.

Alternatively, a cam follower (e.g., cam follower 307) is mounted to each pulley 304 (sometimes referred to herein as a disk or timing pulley) in another manner, but so the cam follower extends out from the timing pulley (in a direction parallel to drive shaft 21 when the apparatus is assembled). During assembly, the cam followers of each pair of timing pulleys (on each side of the apparatus) are aligned with teeth of the timing pulleys so that when assembled with a connector rod between the aligned cam followers and a timing belt driving the timing pulleys, the connector rod's orientation is fixed parallel to a line between the timing pulleys' centers and perpendicular to the translating direction of fruit holders with which the pitting knife assembly is employed.

Then, two drive pulleys 315 are slid onto drive shaft 21, and fastened to shaft 21 with set screws. A timing belt 325 is looped around the pair of timing pulleys 304 and one drive pulley 315 on one side of the apparatus, and another timing belt 325 is looped around the other pair of timing pulleys 304 and the other drive pulley 115 on the other side of the apparatus. Drive shaft 21 is mounted to frame side portions 308 and 308A using drive bearings so that shaft 21 is free to rotate relative to the frame. A timing belt adjustment element 316 is mounted to each side of the frame for adjusting (tensioning) each timing belt 325. Pulley 11B is fixedly attached to an end of shaft 21, so that rotation of pulley 11B causes shaft 21 to rotate about its axis relative to the frame. Typically also, sprocket 59 is fixedly attached to pulley 11B and 21B. Elements 59 and 21B are omitted from FIG. 11 for clarity but shown in FIG. 15.

Knife mount 301 is fastened between connector rods 313, and pitting knives 102 (typically, two rows of four knives 102) are mounted to knife mount 301.

Motor 11 is mounted to the frame. Drive pulley 11A is rotatably mounted to the frame by a bearing and fixedly attached to a rotatable motor shaft (which extends out from motor 11). Drive belt 11C (shown in FIGS. 11 and 13 but not in FIG. 12 for clarity) is looped around pulleys 11A and 11B. Pulley 21B and sprocket 59 are fixedly attached to pulley 11B. Thus, in response to rotation of pulley 11A by motor 11, drive belt 11C rotates pulleys 11B and 21B and sprocket 59 together as a unit relative to the frame.

As drive shaft 21 is driven by rotating pulley 11B, the drive pulleys 315 drive the timing belts 325 on both sides of the apparatus, which in turn rotates pulleys 304. This rotation of pulleys 304 moves both connector rods 313 in a circular pattern, and such movement of rods 313 moves knife mount 301 (and each pitting knife 102 mounted thereto) around a circular path. When a fruit holder conveyor assembly is positioned below the knife mount 301, and the conveyor assembly operates to advance fruit holders (e.g., holders 36 of FIG. 15), and fruit within the holders, perpendicular to the plane of FIG. 15 (or FIG. 12), movement of knife mount 301 around this circular path plunges each pitting knife 102 (mounted to the mount 301) through one of the holders (and into any article of fruit within the holder, thereby removing the pit from the fruit), and then raises the knife mount 301 (and each pitting knife 102) away from the fruit leaving the pitted fruit in the holder.

In variations on the described apparatus, the inventive pulley drive mechanism (including a pair of connector elements corresponding to rods 313) moves a pitting knife mount (and each pitting knife mounted thereto) around a closed path that is substantially circular but not circular. Movement of the knife mount around this closed path (while a conveyor assembly operates to advance fruit holders relative to the pitting knife assembly) can also plunge each pitting knife (mounted to the mount) through one of the holders (and into any article of fruit within the holder, thereby removing the pit from the fruit), and then raises the knife mount (and each pitting knife) away from the fruit leaving the pitted fruit in the holder.

Figure 12:
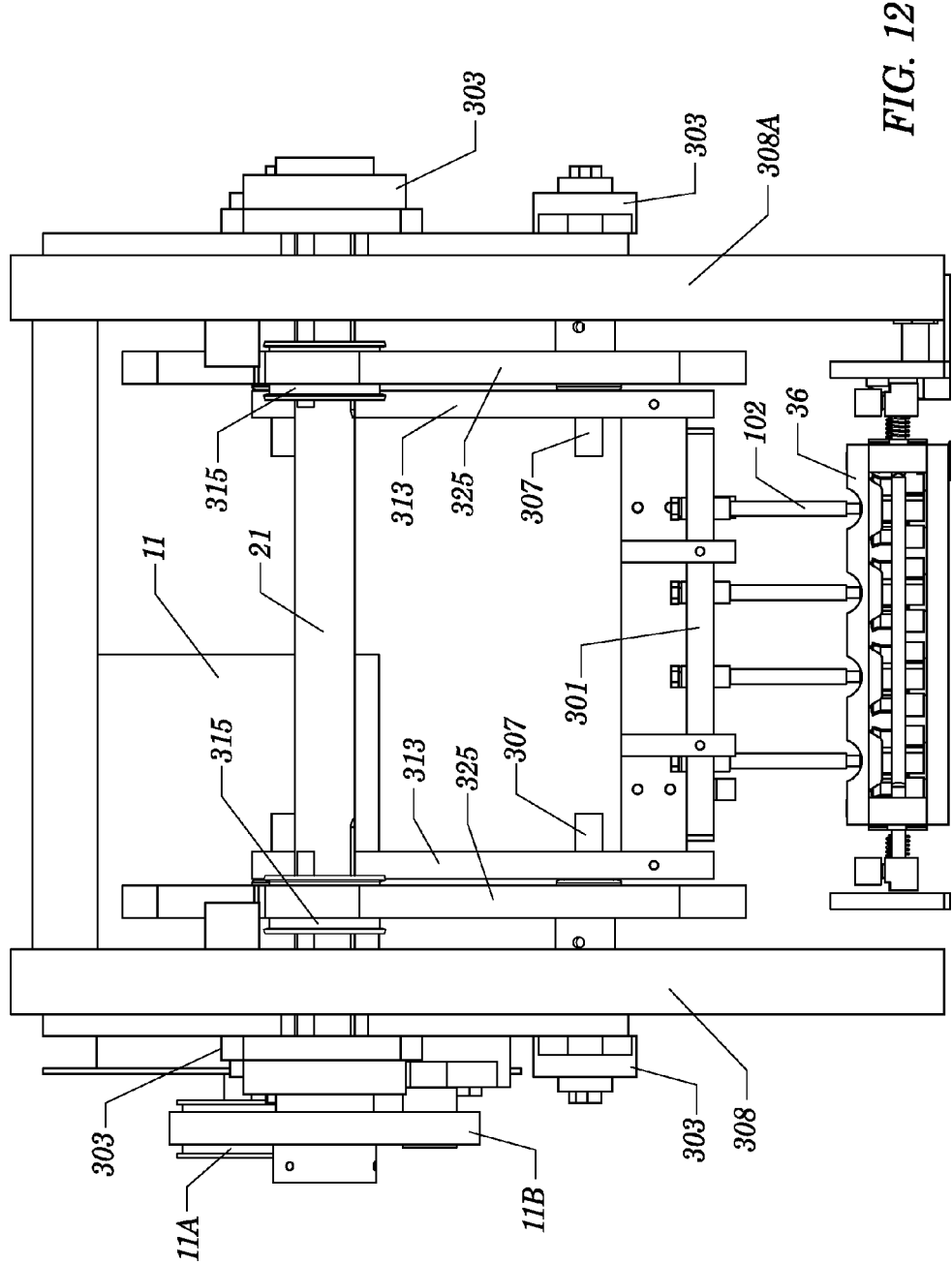
FIG. 12 is a front view of a portion of the FIG. 11 assembly.
Figure 13:
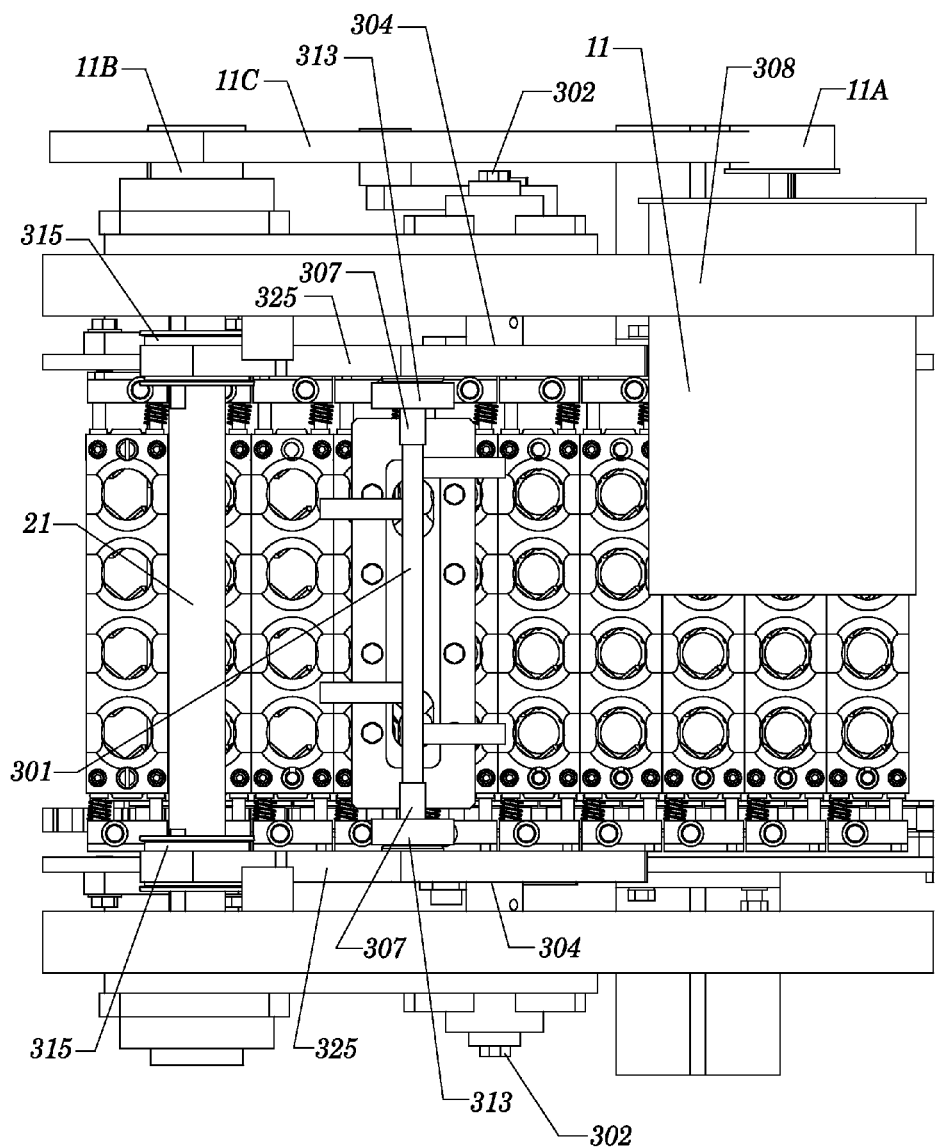
FIG. 13 is a top view of the FIG. 11 assembly.
Figure 14:
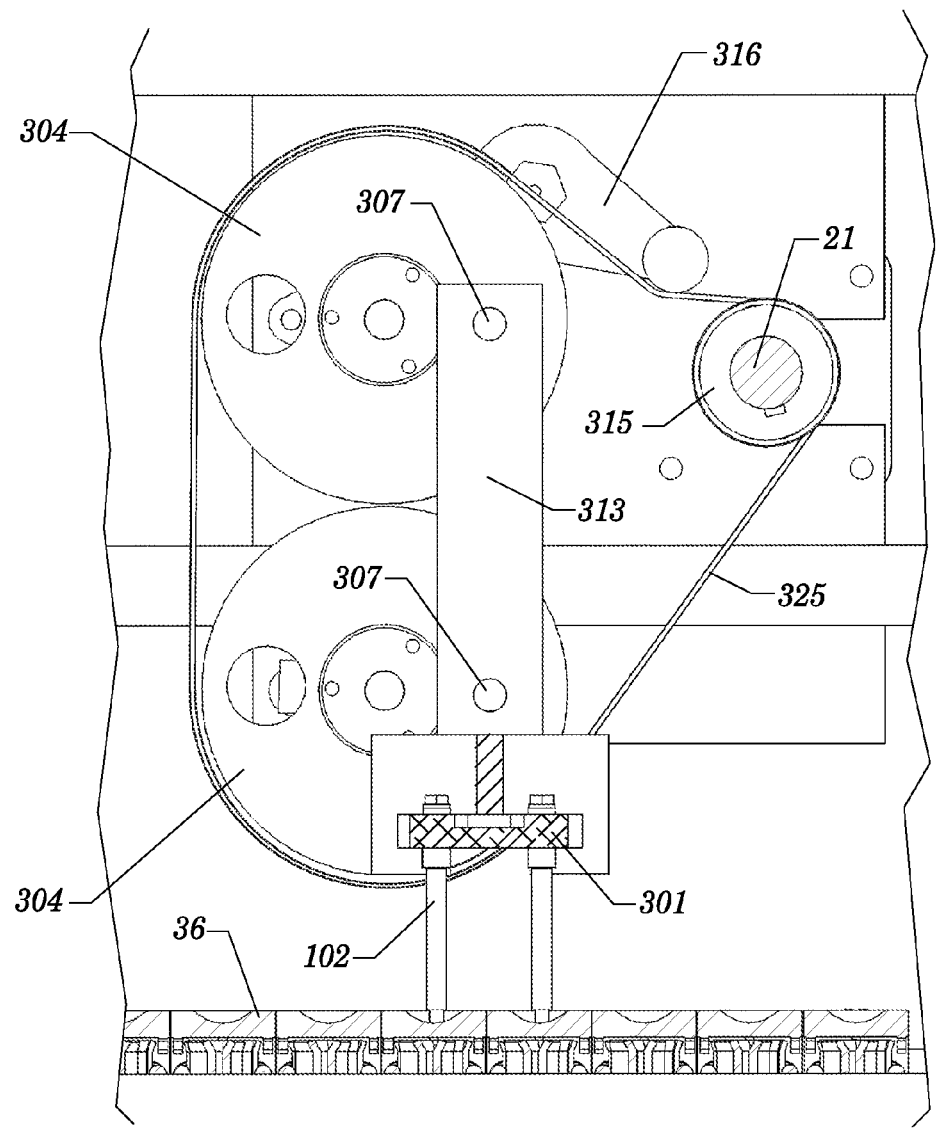
FIG. 14 is a cross-sectional view (in a vertical plane) of a portion of the FIG. 11 assembly.

As noted, FIG. 15 is an end elevational view of a prune pitting apparatus whose pitting knife assembly is identical to the FIG. 12 assembly. When the apparatus is fully assembled, the pitting knife assembly can position pitting knife mount 301 and thus pitting knives 102 in a lowered position (shown in phantom view in FIG. 15) relative to fruit holders 36. As the holders 36 advance in a direction perpendicular to the plane of FIG. 15 and the pitting knife assembly moves knife mount 301 around a circular path, the pitting knife assembly is configured to move mount 301 into a fully lowered position (not shown) in which knives 102 extend into the holders 36, and then into a raised position in which the knives 102 are disengaged from (and above) the holders 36. The circular path is in a plane perpendicular to the plane of FIG. 15.

In a class of embodiments, the pitting apparatus of the invention employs an intermittent fruit holder conveyor drive mechanism to accomplish pitting of prunes, dates, or similar soft fruit. In these embodiments, the holder conveyor drive mechanism translates the fruit holders (e.g., holders 36) into position for pitting, then keeps the holders stationary after pitting (while the pitting knives are repositioned for a subsequent pitting operation), and then translates the holders away from the pitting position and translates a new set of holders into position for pitting (so that each holder undergoes intermittent motion). For example, in operation of preferred implementations of the FIG. 15 apparatus, the holders 36 translate intermittently around the loop defined by chains 35. For example, sprockets 32C of the conveying assembly of FIG. 15 (or an assembly associated with sprockets 32C) include a cam driven indexer that is configured to move fruit holders 36 intermittently relative to the pitting knife assembly. The cam driven indexer times the motion of holders 36 relative to the pitting knife assembly, and the cam driven indexer is preferably configured to move the fruit holders 36 at a forward speed that matches the forward speed of each pitting knife 102 of the pitting knife assembly (while the pitting knife moves into engagement with fruit in one of the holders and pits the fruit), and then to stop each fruit holder 36 after pitting to allow the pitting knife assembly to rotate the pitting knife up 102, around and back down for another pitting index.

In some alternative embodiments, variations on the FIG. 15 apparatus translate holders 36 continuously around the loop defined by chains 35 (even during pitting). In such embodiments, the apparatus would typically include notched cam tracks 85 and 85A of the same type as described above with reference to FIG. 7.

In other embodiments, the invention is an apparatus for pitting fruit (e.g., prunes) of any of the types described above, but with one or more of its conveyors implemented as elastomeric timing belts rather than as metal chains (such as chain 35 looped around sprockets 32 and 34). Use of such timing belts eliminates problems which can result due to chain stretch and eliminates the need to lubricate metal conveyor chains.

The foregoing is merely illustrative and explanatory of preferred embodiments of the inventive apparatus. Various changes in the component sizes and shapes, and other details of the embodiments described herein may be within the scope of the appended claims.

What is claimed is:

1. A pitting knife assembly, including:
   a pitting knife mount; and
   a pulley drive assembly coupled to the pitting knife mount and configured to move the pitting knife mount around an at least substantially circular path.

2. The assembly of claim 1, wherein the pulley drive assembly is configured so that during operation of the pitting knife assembly with at least one pitting knife mounted to the pitting knife mount and a fruit conveying assembly operating to convey fruit to the pitting knife assembly, the pitting knife can produce pitted fruit by moving into engagement with fruit conveyed by the conveying assembly as the pitting knife mount moves through a first portion of the path, and the pitting knife can then move out of engagement with and away from the pitted fruit as the pitting knife mount moves through a second portion of the path.

3. The assembly of claim 1, wherein the pulley drive assembly includes:
   a frame;
   a drive shaft assembly rotatably mounted to the frame;
   at least one pair of pulleys coupled to and drivable by the drive shaft assembly; and
   a connector rotatably connected between the pulleys of each said pair so as to remain oriented at least substantially parallel to a line through the centers of the pulleys while the pulleys are driven by the drive shaft assembly, wherein the pitting knife mount is coupled to the connector such that said connector moves the pitting knife mount around the at least substantially circular path when each said pair of pulleys is driven by the drive shaft assembly.

4. The assembly of claim 3, wherein the drive shaft assembly includes a drive shaft, a first drive pulley coupled to the drive shaft, and a second drive pulley coupled to the drive shaft, and the pulley drive assembly includes:
   a first pair of pulleys, a first timing belt around the first pair of pulleys and the first drive pulley, a first connector rotatably connected between the pulleys of the first pair so as to remain oriented at least substantially parallel to a line through the centers of the pulleys of the first pair while said pulleys are driven by the first timing belt in response to rotation of the first drive pulley relative to the frame; and
   a second pair of pulleys, a second timing belt around the second pair of pulleys and the second drive pulley, a second connector rotatably connected between the pulleys of the second pair so as to remain oriented at least substantially parallel to a line through the centers of the pulleys of the second pair while said pulleys are driven by the second timing belt in response to rotation of the second drive pulley relative to the frame.

5. A fruit pitting apparatus including:
   a pitting knife assembly; and
   a conveying assembly positioned and configured to convey fruit to the pitting knife assembly, wherein the pitting knife assembly includes:
   at least one pitting knife; and
   a pulley drive assembly coupled and configured to move the pitting knife around an at least substantially circular path.

6. The apparatus of claim 5, wherein said fruit pitting apparatus is configured to remove pits from prunes, the conveying assembly includes holders configured to receive prunes, and said conveying assembly is configured to seat prunes in the holders and to translate the holders with the prunes seated therein intermittently past the pitting knife assembly.

7. The apparatus of claim 5, wherein said fruit pitting apparatus is configured to remove pits from prunes, the conveying assembly includes holders configured to receive prunes, and said conveying assembly is configured to seat prunes in the holders and to translate the holders with the prunes seated therein past the pitting knife assembly.

8. The apparatus of claim 5, wherein the pulley drive assembly is configured so that during operation of the fruit pitting assembly with the conveying assembly conveying fruit to the pitting knife assembly, the pitting knife can produce pitted fruit by moving into engagement with fruit conveyed by the conveying assembly as the pitting knife moves through a first portion of the path, and the pitting knife can then move out of engagement with and away from the pitted fruit as the pitting knife moves through a second portion of the path.

9. The apparatus of claim 5, also including a knife mount to which the pitting knife is mounted, and wherein the pulley drive assembly includes:
   a frame;
   a drive shaft assembly rotatably mounted to the frame;
   at least one pair of pulleys coupled to and drivable by the drive shaft assembly; and
   at least one connector rotatably connected between the pulleys of each said pair so as to remain oriented at least substantially parallel to a line through the centers of the pulleys of the pair while the pulleys are driven by the drive shaft assembly, wherein the knife mount is coupled to the connector such that said connector moves the knife mount with the pitting knife around the at least substantially circular path when each said pair of pulleys is driven by the drive shaft assembly.

10. The apparatus of claim 9, wherein the drive shaft assembly includes a drive shaft, a first drive pulley coupled to the drive shaft, and a second drive pulley coupled to the drive shaft, and the pulley drive assembly includes:
    a first pair of pulleys, a first timing belt around the first pair of pulleys and the first drive pulley, a first connector rotatably connected between the pulleys of the first pair so as to remain oriented at least substantially parallel to a line through the centers of the pulleys of the first pair while said pulleys are driven by the first timing belt in response to rotation of the first drive pulley relative to the frame; and
    a second pair of pulleys, a second timing belt around the second pair of pulleys and the second drive pulley, a second connector rotatably connected between the pulleys of the second pair so as to remain oriented at least substantially parallel to a line through the centers of the pulleys of the second pair while said pulleys are driven by the second timing belt in response to rotation of the second drive pulley relative to the frame.

11. A fruit pitting apparatus, including:
    holders having pockets dimensioned to hold soft fruit, each of the pockets being configured to be movable between an open configuration and a closed configuration;
    a pitting knife assembly including a knife set and a pulley drive assembly coupled and configured to move the knife set around an at least substantially circular path, wherein the knife set includes one or more pitting knives; and
    a holder drive assembly coupled to the holders and configured to translate the holders around a closed loop, each of the holders passing the pitting knife assembly while translating around the closed loop.

12. The apparatus of claim 11, wherein said fruit pitting apparatus is configured to remove pits from prunes, the holder drive assembly is configured to translate the holders with prunes seated therein intermittently around the closed loop.

13. The apparatus of claim 12, wherein the pulley drive assembly is configured so that during operation, the knife set can produce pitted fruit as the pulley drive assembly moves at least one knife of the knife set into engagement with fruit in at least one of the holders while the knife set moves through a first portion of the path, and the pulley drive assembly can move each knife of the knife set out of engagement with and away from the pitted fruit while the knife set moves through a second portion of the path.

14. The apparatus of claim 11, wherein the pitting knife assembly also includes a knife mount to which the knife set is mounted, and wherein the pulley drive assembly includes:
a frame;
a drive shaft assembly rotatably mounted to the frame;
at least one pair of pulleys coupled to and drivable by the drive shaft assembly; and
at least one connector rotatably connected between the pulleys of each said pair so as to remain oriented at least substantially parallel to a line through the centers of the pulleys of the pair while the pulleys are driven by the drive shaft assembly, wherein the knife mount is coupled to the connector such that said connector moves the knife mount with the knife set around the at least substantially circular path when each said pair of pulleys is driven by the drive shaft assembly.

15. The apparatus of claim 14, wherein the drive shaft assembly includes a drive shaft, a first drive pulley coupled to the drive shaft, and a second drive pulley coupled to the drive shaft, and the pulley drive assembly includes:
a first pair of pulleys, a first timing belt around the first pair of pulleys and the first drive pulley, a first connector rotatably connected between the pulleys of the first pair so as to remain oriented at least substantially parallel to a line through the centers of the pulleys of the first pair while said pulleys are driven by the first timing belt in response to rotation of the first drive pulley relative to the frame; and
a second pair of pulleys, a second timing belt around the second pair of pulleys and the second drive pulley, a second connector rotatably connected between the pulleys of the second pair so as to remain oriented at least substantially parallel to a line through the centers of the pulleys of the second pair while said pulleys are driven by the second timing belt in response to rotation of the second drive pulley relative to the frame.

* * * * *